(12) United States Patent  
Epstein

(10) Patent No.: US 12,374,026 B1
(45) Date of Patent: Jul. 29, 2025

(54) APPARATUS AND METHOD FOR GENERATING AND DISPLAYING THREE-DIMENSIONAL IMAGES

(71) Applicant: Kenneth Epstein, Baldwin, NY (US)

(72) Inventor: Kenneth Epstein, Baldwin, NY (US)

(*) Notice: Subject to any disclaimer, the term of this patent is extended or adjusted under 35 U.S.C. 154(b) by 0 days.

(21) Appl. No.: 18/742,900

(22) Filed: Jun. 13, 2024

Related U.S. Application Data

(60) Provisional application No. 63/559,599, filed on Feb. 29, 2024, provisional application No. 63/627,534, filed on Jan. 31, 2024.

(51) Int. Cl.
G06T 15/10 (2011.01)

(52) U.S. Cl.
CPC .................................. G06T 15/10 (2013.01)

(58) Field of Classification Search
None
See application file for complete search history.

(56) References Cited

U.S. PATENT DOCUMENTS

| | | | |
|---|---|---|---|
| 9,630,365 B2 | 4/2017 | Frayne et al. | |
| 9,781,411 B2 | 10/2017 | Frayne et al. | |
| 10,012,841 B1 | 7/2018 | Frayne et al. | |
| 10,104,369 B2 | 10/2018 | Frayne et al. | |
| 10,110,884 B2 | 10/2018 | Frayne et al. | |
| 10,151,931 B2 | 12/2018 | Frayne et al. | |
| 10,191,295 B2 | 1/2019 | Frayne et al. | |
| 10,241,344 B1 | 3/2019 | Frayne et al. | |
| 10,298,921 B1 | 5/2019 | Frayne et al. | |
| 10,310,284 B1 | 6/2019 | Waldron et al. | |
| 11,051,006 B2 | 6/2021 | Frayne et al. | |
| 11,092,724 B1 | 8/2021 | Waldron et al. | |
| 11,256,214 B2 | 2/2022 | Hornstein et al. | |
| 11,388,388 B2 | 7/2022 | Hornstein et al. | |
| 11,415,728 B2 | 8/2022 | Hornstein et al. | |
| 11,415,935 B2 | 8/2022 | Hornstein et al. | |
| 11,425,363 B2 | 8/2022 | Appelgate et al. | |
| 11,449,004 B2 | 9/2022 | Hornstein et al. | |
| 11,683,472 B2 | 6/2023 | Frayne et al. | |
| 11,736,680 B2 | 8/2023 | Kahn et al. | |
| 11,754,975 B2 | 9/2023 | Hornstein et al. | |
| 11,849,102 B2 | 12/2023 | Hornstein et al. | |
| 2020/0159104 A1* | 5/2020 | Spiegelman | G03B 21/145 |

* cited by examiner

*Primary Examiner* — Nurun Flora
(74) *Attorney, Agent, or Firm* — Shore IP Group, PLLC; Sean R. Wilsusen

(57) ABSTRACT

A 3D volumetric image projection system includes a housing, a track positioned in the housing, an optical fold mirror configured to slide on the track to adjust at least an axial position of the optical fold mirror within the housing, and a curved mirror configured to receive reflected light from the optical fold mirror and project a three-dimensional image outside of the housing.

19 Claims, 21 Drawing Sheets

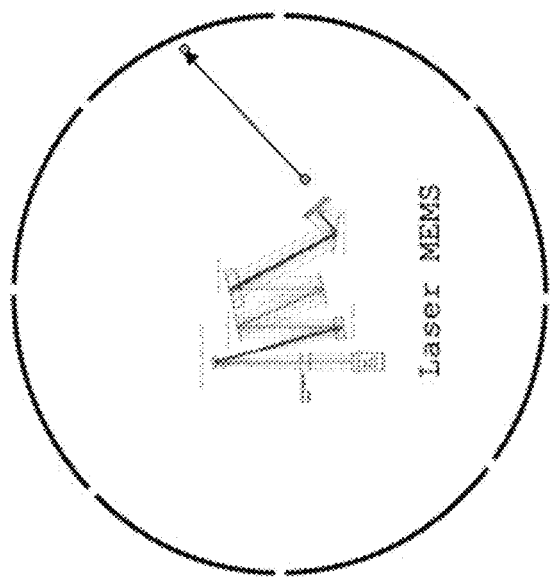
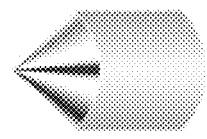
FIG. 15B
FIG. 15C
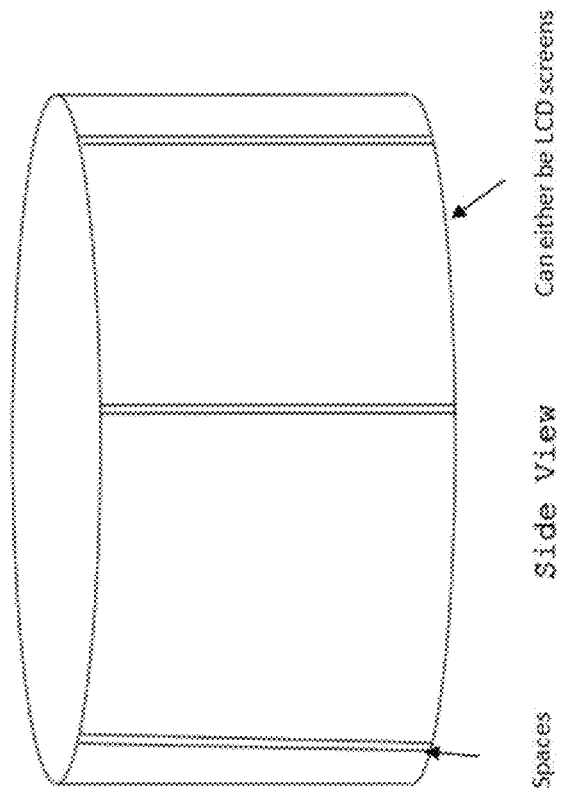
Side View
FIG. 15A
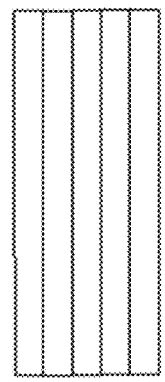
FIG. 15D

APPARATUS AND METHOD FOR GENERATING AND DISPLAYING THREE-DIMENSIONAL IMAGES

CROSS-REFERENCE TO RELATED APPLICATION

The present non-provisional patent application claims priority to U.S. Provisional Patent Application No. 63/627,534, filed on Jan. 31, 2024, and U.S. Provisional Patent Application No. 63/559,599, filed on Feb. 29, 2024, the entire contents of which are incorporated by reference herein.

FIELD

The present disclosure relates to generating 3-dimensional (3D) images and, more particularly, to an apparatus of method for generating and displaying 3D images.

BACKGROUND

Current systems for projecting three-dimensional video images may include a high-brightness liquid crystal display device that projects an image outward to an observer. A shortcoming of typical holographic-image projectors is that increasing the size of the projected image requires larger components, such as, for example, a larger liquid crystal display, beam splitter, and mirror, which increase the overall size of the projection system. In addition, the larger display adds weight to the projection system, and larger components are generally more expensive. Further, the light projected is not especially bright. Moreover, a viewer may not be able to view the projected image from all angles around the object because of the limitations of the optical characteristics of the described projection system, which project the image for viewing over a relatively narrow angle around the projected object.

SUMMARY

In an aspect of the present disclosure, a 3D volumetric image projection system is provided and includes a housing, a track positioned in the housing, an optical fold mirror configured to slide on the track to adjust at least an axial position of the optical fold mirror within the housing, and a curved mirror (e.g., an off-axis concave mirror) configured to receive reflected light from the optical fold mirror and project a three-dimensional image outside of the housing.

In an aspect of the present disclosure, the system may further include a tray slidably supported on the track. The optical fold mirror may be supported on the tray.

In an aspect of the present disclosure, the system may further include a display device for displaying an image that is represented by the 3D image. The display device may be supported in the tray. The optical fold mirror and the display device may be configured to move along the track as a unit.

In an aspect of the present disclosure, the display device may be oriented in a direction facing the optical fold mirror.

In an aspect of the present disclosure, the display device may include a tablet, a monitor, and/or a mobile phone.

In an aspect of the present disclosure, the system may further include a robotic arm that has a proximal end slidably supported on the track, and a distal end supporting an end effector configured to support an object that is represented by the three-dimensional image. The robotic arm may be configured to adjust a spatial position of the object relative to the optical fold mirror.

In an aspect of the present disclosure, the system may further include an object storage area positioned within the housing adjacent the track.

In an aspect of the present disclosure, the track may include a first pair of spaced-apart, parallel rails, and a second pair of spaced-apart, parallel rails positioned between the first pair of spaced-apart, parallel rails and configured to slide relative to and along the first pair rails along a horizontal axis. The optical fold mirror may be slidably supported on the second pair of rails and configured to slide relative to and along the second pair of rails along a vertical axis that is perpendicular to the horizontal axis.

In an aspect of the present disclosure, the housing may include a window through which the reflected light from the curved mirror is transmitted.

In an aspect of the present disclosure, the window may be an opening, transparent glass, or a transparent display.

In an aspect of the present disclosure, the window may be a transparent display configured to display an image between the three-dimensional image and the curved mirror.

In an aspect of the present disclosure, the housing may include a front wall, which has the window.

In an aspect of the present disclosure, the housing may include a rear wall spaced from the front wall. The rear wall may include a rear display device.

In an aspect of the present disclosure, an autonomous vehicle may be provided to support and mobilize the system. For example, the autonomous vehicle, with the system mounted thereto, may roam a mall or other public area for easy access by the public.

In an aspect of the present disclosure, the system may be incorporated into, or may operate adjacent or in conjunction with a vending machine. For example, the system may be incorporated into a smart vending machine, a frozen vending machine, a coffee vending machine, a vending machine configured to dispense various products, a vending machine configured to dispense medications or personal hygiene produces, or a vending machine configured to dispense food, snacks, or other edible products.

In accordance with another aspect of the present disclosure, a system for generating and displaying a three-dimensional image is provided that includes a housing, a transparent display, an optical fold mirror, and an off-axis concave mirror. The housing defines a chamber therein and includes a front wall defining an opening therethrough. The transparent display is positioned in the opening in the front wall and is configured to display an image. The optical fold mirror is positioned in the chamber of the housing, and the concave mirror is configured to receive reflected light from the optical fold mirror and project a three-dimensional image outside of the housing in front of the transparent display.

In an aspect of the present disclosure, the system may further include a robotic arm positioned in the chamber of the housing and configured to support an object (e.g., a 3D object) that is represented by the three-dimensional image (e.g., is projected as a 3D image). The robotic arm may be configured to adjust a pitch, yaw, and/or roll of the object.

In an aspect of the present disclosure, the system may further include a track movably supporting the robotic arm and the optical fold mirror such that the robotic arm and the optical fold mirror are configured to move together within the housing.

In an aspect of the present disclosure, the system may further include a LED lighting assembly (e.g., a chip on board LED lighting system) positioned adjacent the optical fold mirror and configured to transmit light onto the object.

In an aspect of the present disclosure, the housing may include a rear wall positioned opposite the front wall. The rear wall may include a display device configured to display an image that is viewable externally of the housing.

In an aspect of the present disclosure, the system may include one or more of the following: a haptic glove, an eye tracking device, an ultrasonic sound generator, a mechanism to move at least one of the optical fold mirror or the eye tracking device, a magnification device, a sound system, or a laser imaging, detection, and ranging ("LIDAR") system.

BRIEF DESCRIPTION OF THE DRAWINGS

Various aspects and features of the present disclosure are described hereinbelow with reference to the drawings wherein:

The present disclosure will become more readily apparent from the specific description accompanied by the following drawings, in which:

FIG. 15A is a side view illustrating an exemplary embodiment of a volumetric monitor;

FIG. 15B is a top view illustrating the volumetric monitor of FIG. 15A showing the laser assembly of FIG. 14A positioned therein;

FIG. 15C is a perspective view illustrating a conical mirror;

FIG. 15D illustrates a stack of flat panel displays;

DETAILED DESCRIPTION

Figure 1:
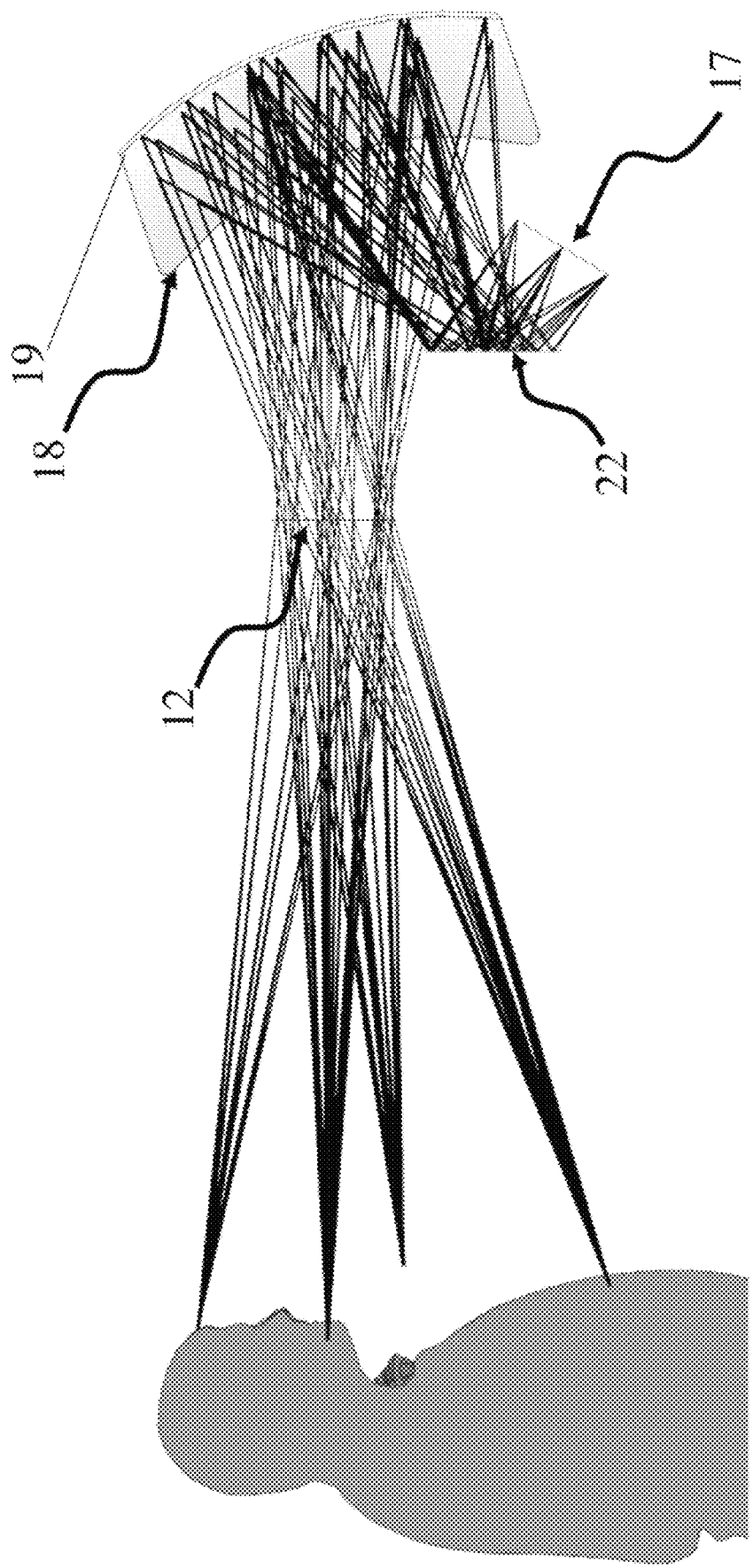
FIG. 1 is a side view of an exemplary embodiment of components of a 3D volumetric image projection system including a concave mirror.
Figure 2:
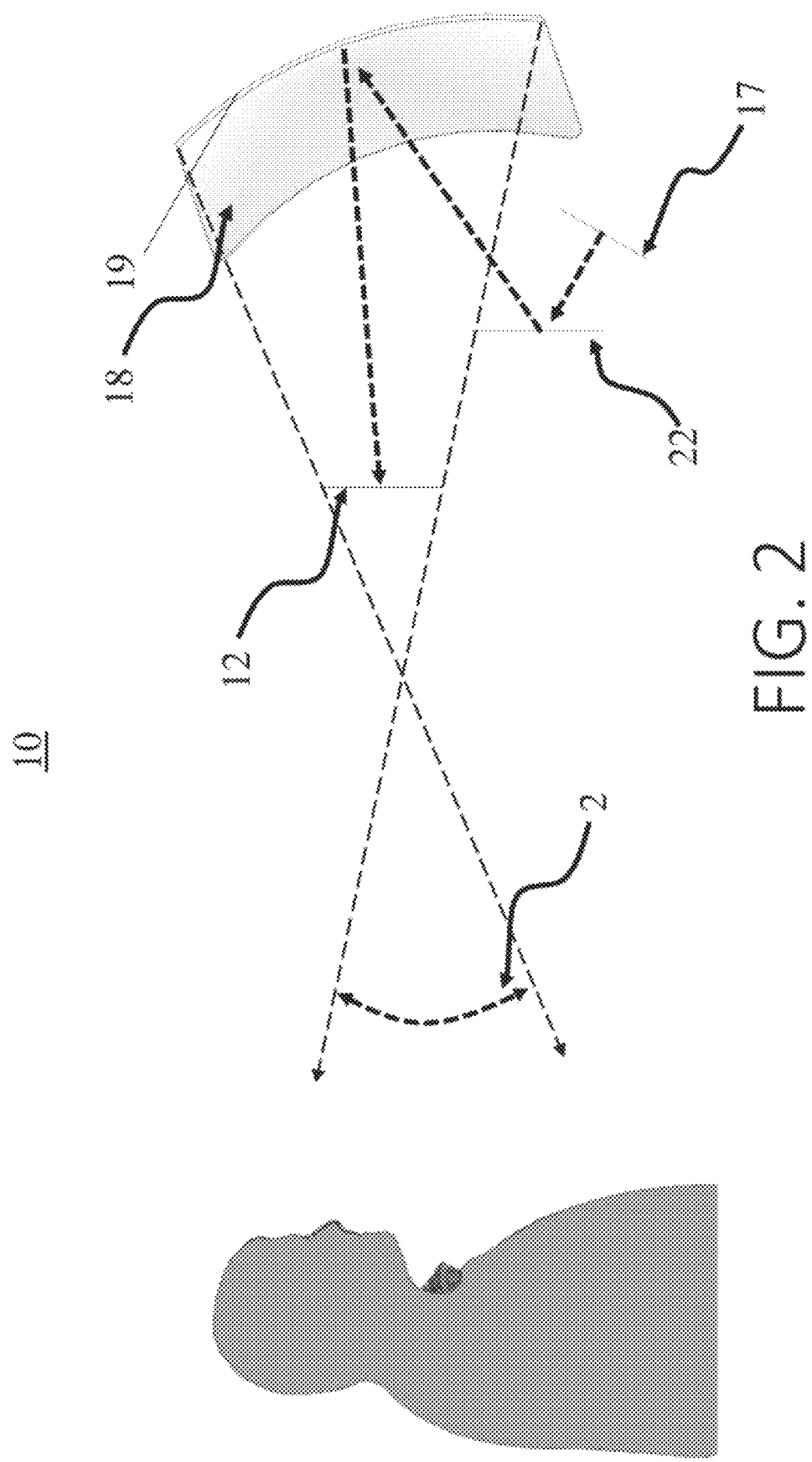
FIG. 2 is a side view of an exemplary embodiment of components of a 3D volumetric image projection system including an off-axis concave mirror.
Figure 3:
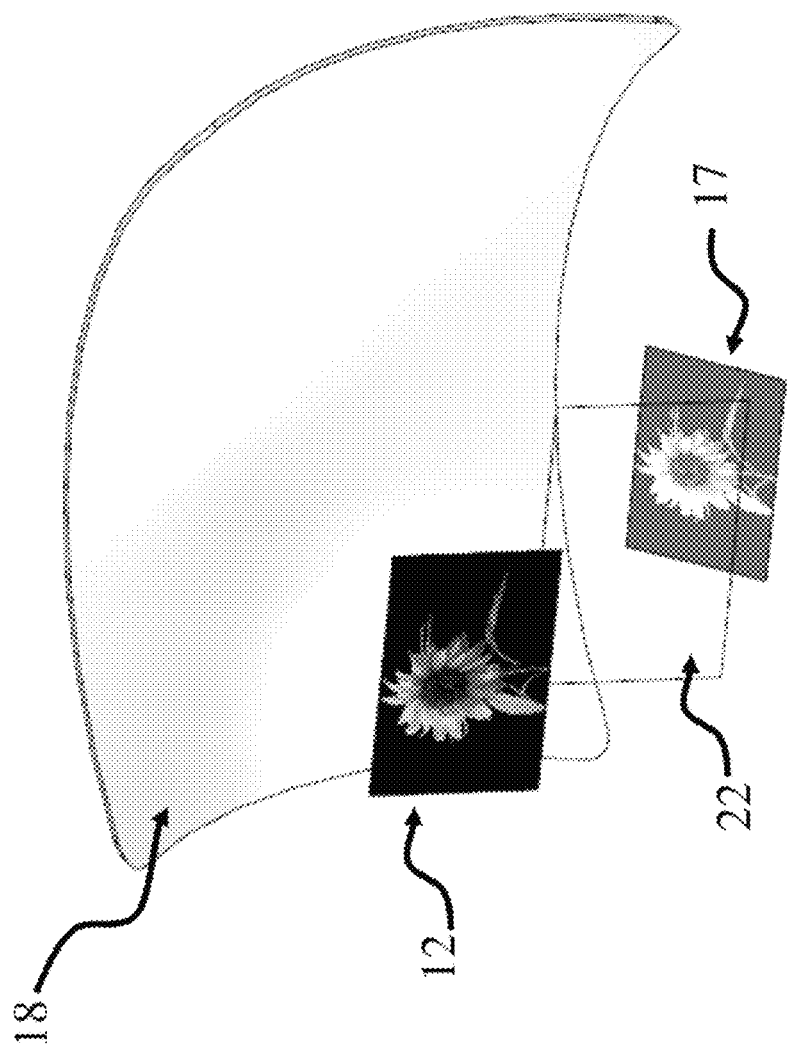
FIG. 3 is a rear, perspective view illustrating components of the systems of FIG. 1 or 2.
Figure 3:
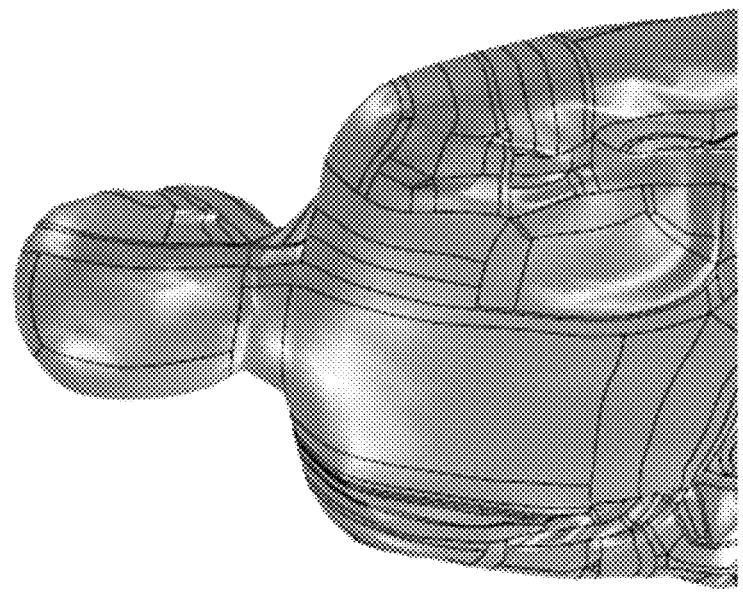

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other and are not necessarily "superior" and "inferior."

The present disclosure provides a three-dimensional image projection system that generally includes an enclosure for housing components of the system, a curved mirror, a fold mirror, a suitable display device configured to produce an image (e.g., a monitor, a tablet, a cell phone, or another device capable of displaying an image or images etc.), and darkened/tilted glass. In some aspects of the present disclosure, the system may include a power source. The display device may be a high resolution monitor (e.g., either stand alone or part of a more complex device) and a projector (e.g., a laser or bulb).

The phrase "volumetric image" and the like may refer to a depiction, such as a displayed 3D image, that includes information about the volume, shape, and spatial relationships within the depicted space. Volumetric images may appear different to a user based on the relative location of the user with respect to the volumetric image. For example, a user may be able to see a greater area of a top or side of a volumetric image by moving their body with respect to the volumetric image (e.g., lifting the user's head higher off the ground to better see the top of the 3D volumetric image). The system described herein is also capable of displaying non-volumetric images, such as 3-dimensional non-volumetric images.

In an aspect of the present disclosure, the three-dimensional volumetric image projection system may further include transparent glass, a robotic arm, a volumetric display tray, a volumetric display device, an eye tracking device, an ultrasonic sound generator, a haptic glove, a mechanism to move the mirror or eye tracking device, a magnification device, a sound system, and/or a laser imaging, detection, and ranging ("LIDAR") system.

In one embodiment, the system may include one or more of the above-noted features to achieve the goals needed to project, touch, and interact with a floating, holographic or 3D volumetric image projected by the system. The system may include a haptic glove to enhance a user's experience, such as by allowing a user to manipulate the 3D volumetric image. However, use of the haptic glove in a public space with a large number of people and security concerns may not be preferred. In such a scenario, instead of a haptic glove, the system may include motion tracking with a camera or LIDAR so the user may interact with the image. The robotic arm may be used with a multi-volumetric display with more than one item but may also be used in a single volumetric display to show motion and may be used to do the same in the multi-display device. Also, in the volumetric device, the system may include a beam splitter, but the larger devices may use either shaded plastic or glass. Transparent glass may replace either the beam splitter or plain shaded glass to provide an interactive background. The transparent glass may be mounted in the unit or added as an external feature.

In an aspect of the present disclosure, one display can have many physical objects to display volumetrically or one cabinet may include multiple units to provide either volumetric and/or holographic display unit.

The eye tracking device and/or ultrasonic sound generator may be mounted externally or internally. A mechanism may be provided for moving either the internal structure or the entire device using the eye tracking to keep the image in the field of view of the observer. The sound system may also be internal or external. The LIDAR unit may be used with the haptic glove to sense where an observer's hand is in relation to the image to provide feedback so the observer can feel the object. In aspects, either the eye tracking or LIDAR unit may be configured to recognize hand gestures to manipulate the image with touch. A device may be provided to magnify the projected 3D image and make the image larger without increasing device size. The system is a volumetric projection ready for any volumetric monitor.

In another embodiment, instead of a single mirror device, the system may include a multi-mirror device with any combination of mirrors having its own display type, which, through computer controlled graphics, the images may be displayed to show one theme or any combination of floating images. In another aspect of the present disclosure, the system may include a single laser device with a rotating mirror that can reflect an image off a plurality of mirrors.

In yet another embodiment, a multi-machine configuration may be provided such that the system may include two or more units to achieve the display dynamics needed.

In yet another embodiment, the system may include a single use device on a 2 or 3 axis device to increase the field of view for advertising situations (e.g., in a diner) where more observers can see from wherever they sit.

In an aspect of the present disclosure, the system may include a transparent display, such as a one-way transparent display that is functionally transparent in one direction but appears opaque in the opposite direction. Transparent displays may be used to communicate dynamic or interactive content via a transparent surface allowing viewers to see what is shown on the screen while still being able to see through the display. This solution provides designers with creative ways to display content with a futuristic effect.

In an aspect of the present disclosure, the system may include a robotic arm. The robotic arm is a type of mechanical arm that is programmable and has similar functions to a human arm. The arm may be made up of links connected by joints that allow rotational motion and/or translational displacement. The terminus of the kinematic chain of the arm may include an end effector analogous to the human hand. The robotic arm may be used in various applications such as pick and place work, application of sealant, assembly operations, handling machine tools, spot welding, die casting, fettling machines, gas welding, arc welding, spray-painting, and more. There are different types of robotic arms such as Cartesian robot, collaborative robot, cylindrical robot, spherical robot, SCARA robot, articulated robot, parallel robot, and anthropomorphic robot. The number of rotary joints of a robotic arm determines its degree of freedom. The arm can be used to hold a physical object in the housing described herein to allow a 3D volumetric image of the physical object to be generated using a system described herein.

In an aspect of the present disclosure, the system may include a volumetric display tray used in a dual device when either a motion or volumetric display device is desired and may be used to easily convert one to the other. The volumetric display tray may contain the robotic arm and other parts necessary to covert the unit to a real model display device.

In an aspect of the present disclosure, the system may include a volumetric display device. A true volumetric display produces in the observer a visual experience of a material object in three-dimensional space, even though no such object is present. The perceived object displays characteristics similar to an actual material object by allowing the observer to view it from any direction, to focus a camera on a specific detail, and to see perspective-meaning that the parts of the image closer to the viewer appear larger than those further away.

In an aspect of the present disclosure, the system may include a multitude of standard display devices, e.g., high brightness LCD displays, phones, and projectors (e.g., standard or laser). It may be preferable in some embodiment to use very large displays, such as a large projector. However, when using a large projector, the further away from the mirror the larger the image becomes. A solution is to provide a 3-color laser with a rotating mirror to create an image in a short distance.

In an aspect of the present disclosure, the system may include an eye tracking device used, for example, in small controlled focused settings so that that image can move with the gaze of the user. The same type of device can track body movement and coordinate with the system so that an observer can constantly see the floating image. In aspects, a video-based eye-tracker may be used. With a video-based eye tracker, a camera focuses on one or both eyes and records eye movement as the viewer looks at some kind of stimulus. Most modern eye-trackers use the center of the pupil and infrared/near-infrared non-collimated light to create corneal reflections (CR). The vector between the pupil center and the CRs may be used to compute the point of regard on surface or the gaze direction. A simple calibration procedure of the individual is usually needed before using the eye tracker.

Two general exemplary types of infrared/near-infrared (also known as active light) eye-tracking techniques may be employed: bright-pupil and dark-pupil. Their difference is based on the location of the illumination source with respect to the optics. If the illumination is coaxial with the optical path, then the eye acts as a retroreflector as the light reflects off the retina creating a bright pupil effect similar to red eye. If the illumination source is offset from the optical path, then the pupil appears dark because the retroreflection from the retina is directed away from the camera. Bright-pupil tracking creates greater iris/pupil contrast, allowing more robust eye-tracking with all iris pigmentation, and greatly reduces interference caused by eyelashes and other obscuring features. Bright-pupil tracking also allows tracking in lighting conditions ranging from total darkness to very bright.

The system includes a concave mirror, which is a curved mirror that forms a part of a sphere and is designed in such a way that rays of light falling on its shiny surface converge upon reflection. The reflective surface of a concave mirror is curved inward and away from the light source, and it reflects light inward to one focal point. The image formed by a concave mirror shows different image types depending on the distance between the object and the mirror. Some of the most important and common applications of the concave mirror are described below. In aspects of the present disclosure, the mirror may be or may include/incorporate a free-form mirror, an off-axis concave mirror, or an off-axis parabolic mirror (OAP), which is a useful tool in optical design. An OAP combines the achromatic and diffraction limited imaging properties of a concave mirror with the ability to deviate the light path off-axis, which is useful for most imaging systems.

A concave mirror takes light from a point source located at the focus and creates a collimated beam. In other words, a source with spherical wavefronts placed at the concave focus is converted into a beam with plane wavefronts. The reverse operation is also true; plane wavefronts incident on the concave mirror are focused at the focal point. This is a valuable tool for optical design because the single surface of an OAP can produce a diffraction limited image without chromatic effects.

A complete concave mirror focuses a collimated beam at its focal point, which is often not useful because it overlaps with part of the incoming beam. Accessing the focal point can be difficult and even impossible without obstructing part of the incoming beam. However, if only a portion of the concave surface is used, the beam will focus off-axis at a more accessible location.

There are two important design considerations to remember when using OAPs: the orientation; and infinite conjugates. A collimated beam incident upon the OAP from the off-axis focal angle will not produce a diffraction limited image. Similarly, a spherical wave incident on-axis will not produce a collimated beam. OAPs only achieve diffraction limited imaging when focusing a collimated beam. Similarly, they only produce a perfectly collimated beam from a spherical wave. OAPs have poor imaging quality when used at finite conjugates. They can be particularly useful when used as part of a relay system, or similar operation to transition between the focal plane and pupil plane. The advantage of off axis is the elimination of the beam splitter.

The object that is ultimately represented by the 3D image can be provided by any display device such as a display screen or any device that uses a display screen volumetric display or laser drawn. The floating 3D image is the result. It can also be a solid model in the case of volumetric.

The system may include a housing or enclosure for the internal parts of the system. The housing has a power switch for AC power, and in some aspects of the present disclosure a rear display for mirroring what the front display is displaying, and an image server control system (e.g., with input jacks to provide battery power for the display, and control settings for the 3 axis gimbal for manual settings of mirror movement and outputs for a surround sound system). A window may be provided in the front panel of the enclosure, which may be either a tinted glass beam splitter, transparent glass, or a tinted window (e.g., a tinted glass window). The system may further include speakers internally mounted or external to the housing, or in other aspects the system may be connected to a surround sound external system.

Figure 8:
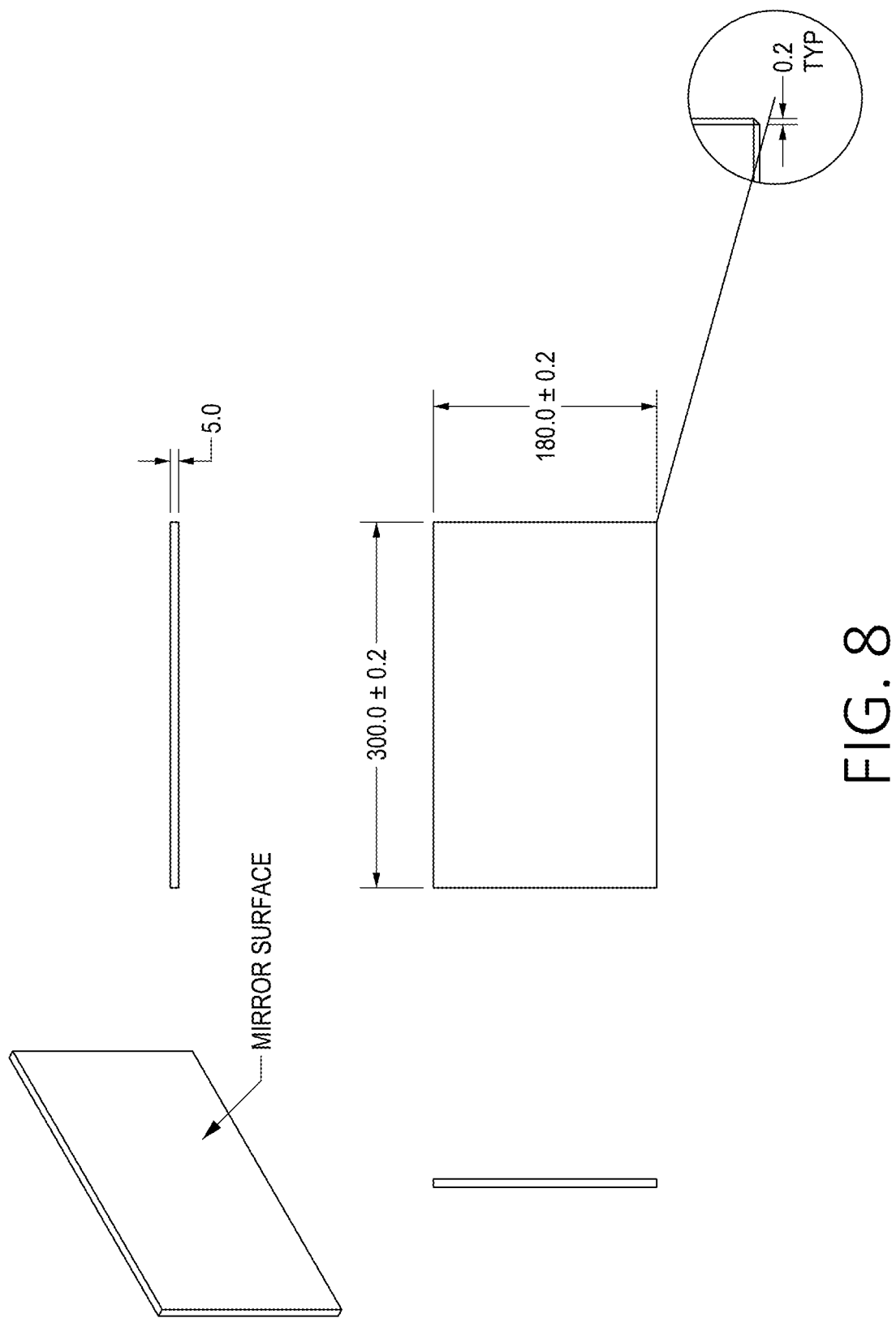
FIG. 8 illustrates a plurality of views of an optical fold mirror used in one or more of the systems of the present disclosure.
Figure 9:
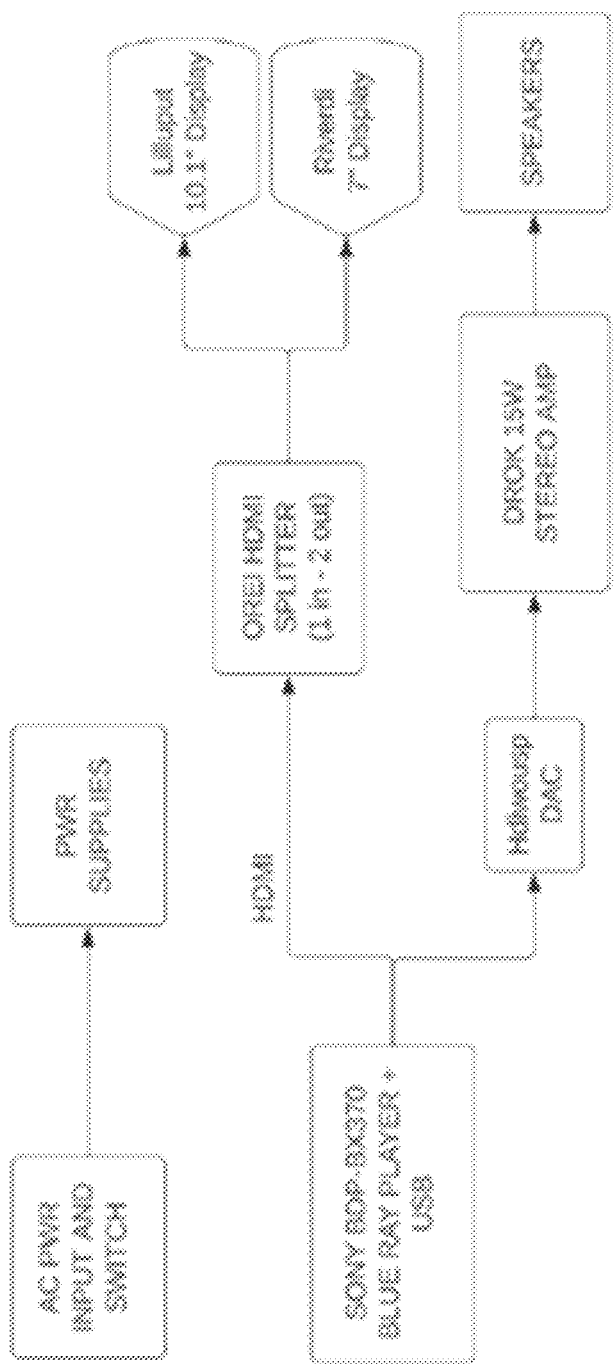
FIG. 9 is a block diagram illustrating exemplary components of a 3D image projection system of the present disclosure.
Figure 10:
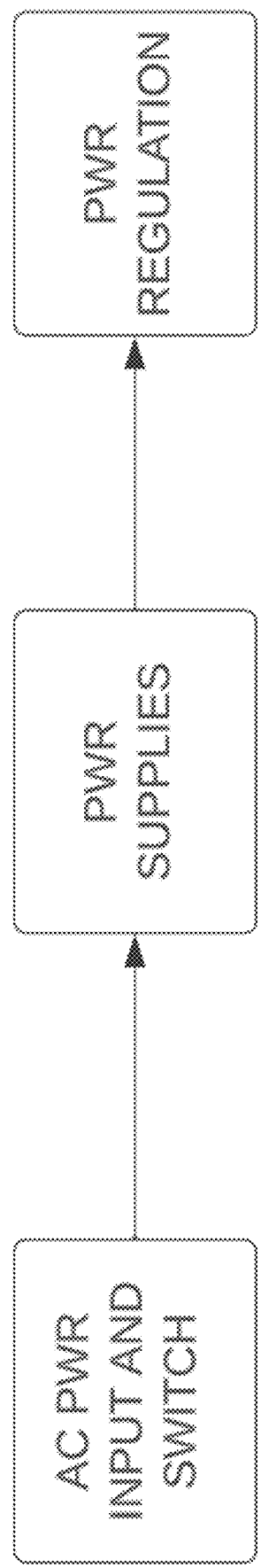
FIG. 10 is a block diagram illustrating a power assembly used in one or more of the systems of the present disclosure.
Figure 11:
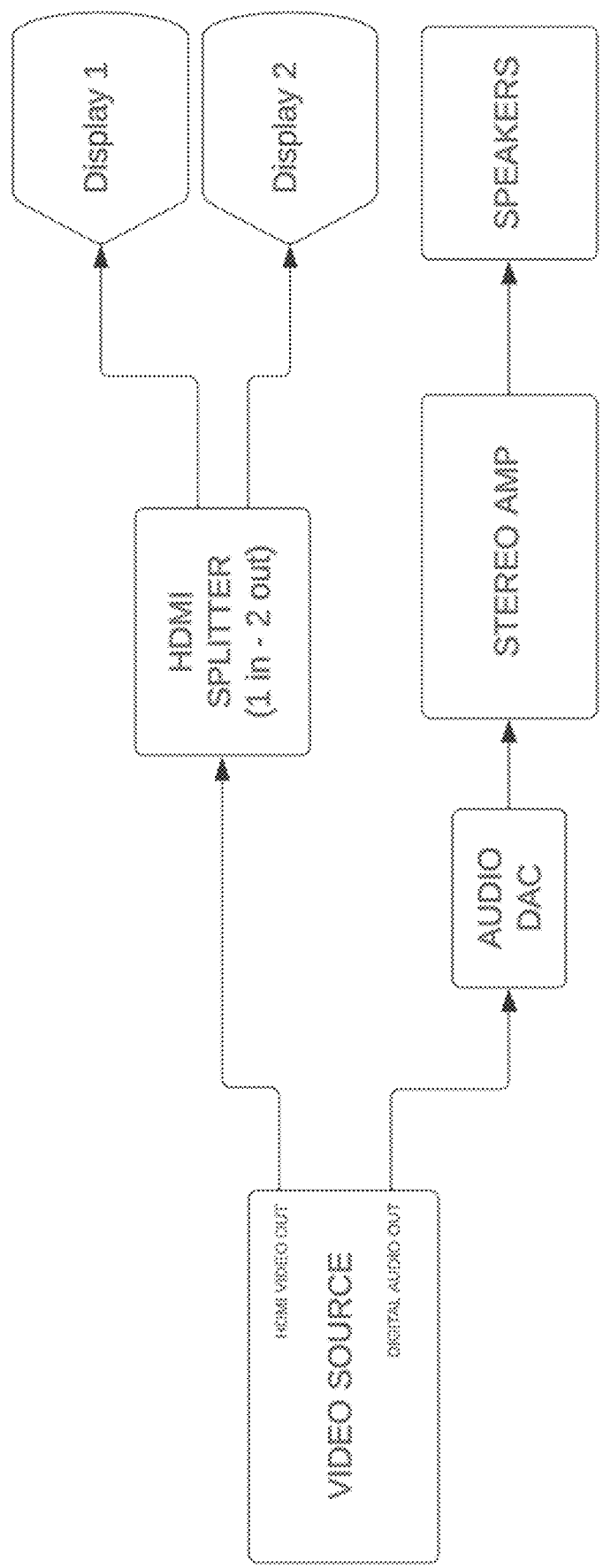
FIG. 11 is a block diagram illustrating an embodiment of a video/audio chain for use in one or more of the systems of the present disclosure.
Figure 12:
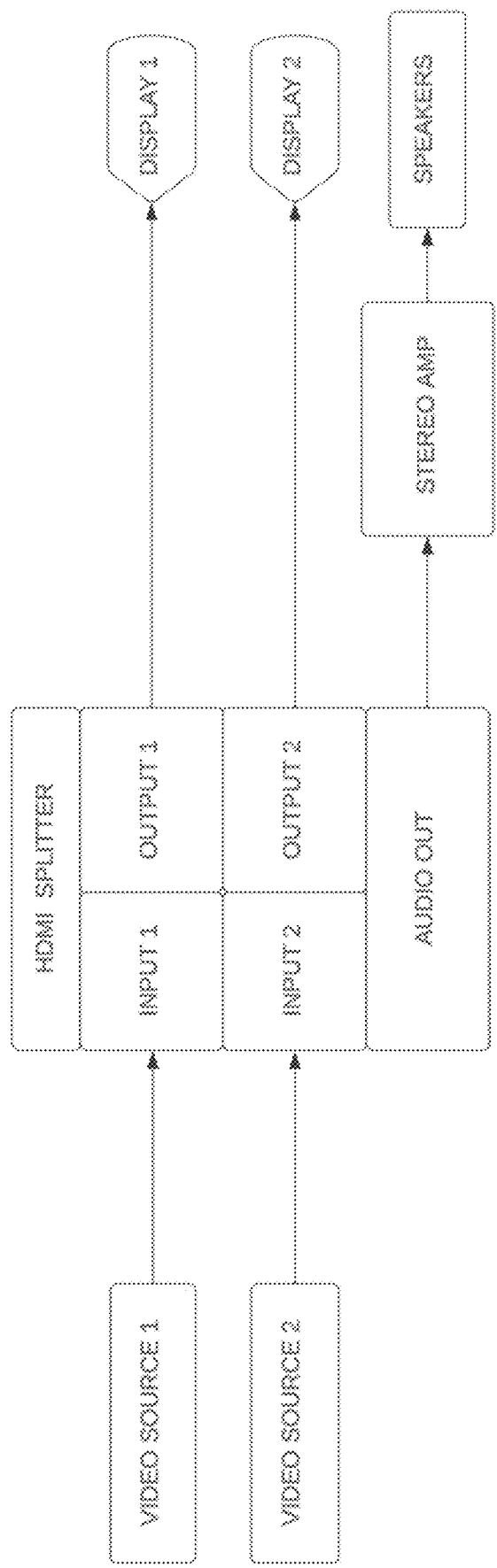
FIG. 12 is a block diagram illustrating another embodiment of a video/audio chain for use in one or more of the systems of the present disclosure.
Figure 13:
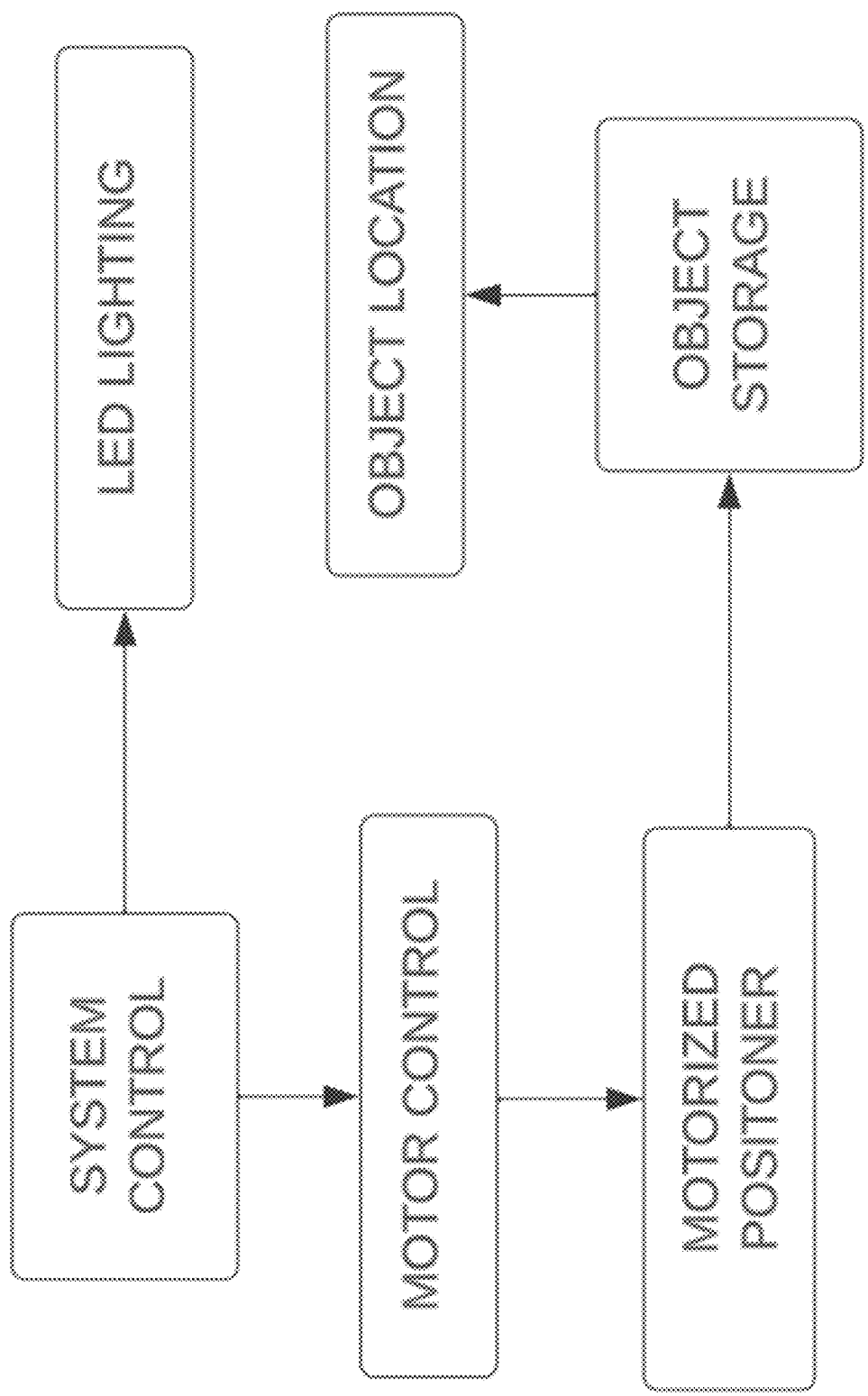
FIG. 13 is a block diagram illustrating a volumetric display control for use in one or more of the systems of the present disclosure.

An optical fold mirror may be provided (see, e.g., FIG. 8). Folded optics is an optical system that uses fold mirrors to make the optical path much longer than the size of the system. This allows the resulting focal length of the object to be viewed to be greater than the physical length of the optical device. One example is a prismatic binocular. Folded optics are also used in periscope cameras, which are designed to allow smart phones to gain considerably more optical zoom than a typical lens design by placing the lens array parallel to the long edge of a smart phone body and bending the transmission of light to the sensor by using one or more prisms. The mirror may be sized up or down depending on the size of the output image. In aspects, the mirror may be replaced by a direct draw laser.

The robotic arm may be implemented in the volumetric display system. A lighting system may be used to illuminate the object to be viewed, which is then displayed to the folding mirror and transferred to the concave mirror for display. The robotic arm is configured to ferry an array of solid model objects to be displayed as a floating image. The robotic arm may be programmed to revolve the object to have the volumetric floating image display the object as if the observer were physically handling the object.

A tray that supports the fold mirror and a display device is configured to slide in an adjustment bracket to adjust the focus of the object being displayed. When the tray is motorized (e.g., the tray may be operating by an electric motor), a user may control movement of the tray from the rear of the housing, or remotely through other means.

The housing includes a window through which the 3D image passes. The window, in aspects, may be transparent glass, such as one-way transparent glass. Transparent glass in monitors is a type of display technology that allows users to see through the screen while still being able to view the content displayed on the screen. An exemplary transparent glass is a transparent OLED screen, which uses self-lighting LEDs on a transparent display for AV and digital signage. The holographic or 3D image passes through the transparent glass, which provides a background for the 3D image. In aspects, the transparent glass may be mounted externally while leaving the tinted glass or beam splitter in place.

Figure 14A:
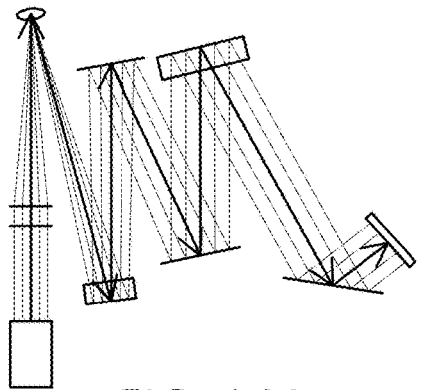
FIG. 14A is a plan view illustrating a laser assembly for use in one or more of the systems of the present disclosure.
Figure 16:
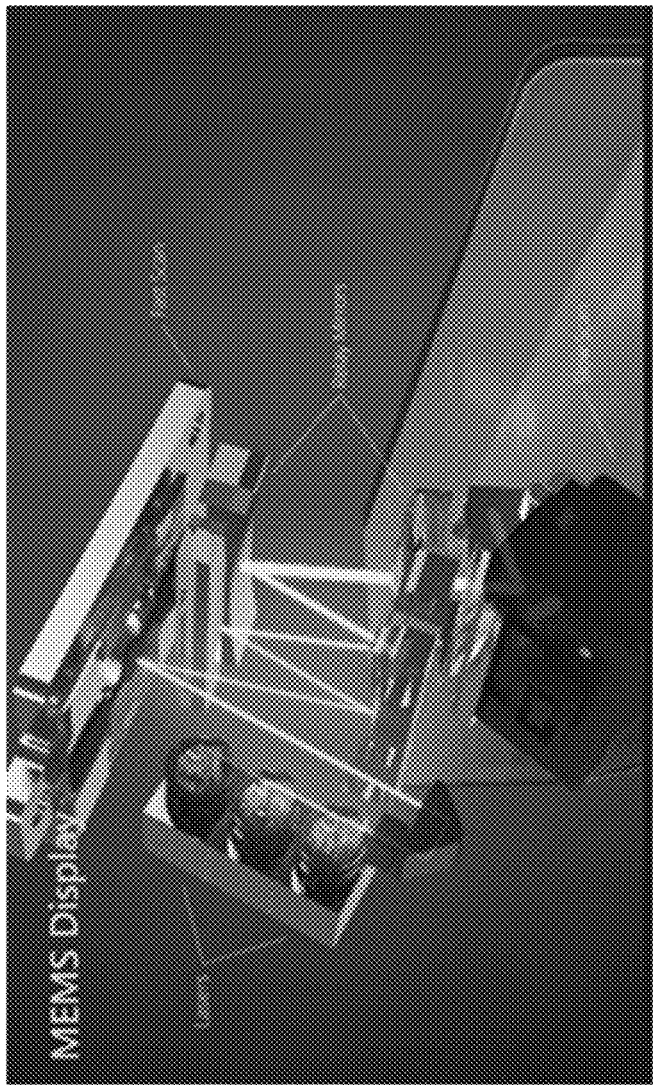
FIG. 16 is a perspective view illustrating a video processing unit.

With reference to FIG. 14A, the system may include a display using a combination of waveguides and light projectors. The light projectors may be positioned inside the housing and may use laser light to illuminate the display. The display engines may use laser-based MEMS mirrors (FIG. 16) to scan photons across the horizontal and vertical dimensions. Surface relief gratings use total internal reflection to guide the photons. A MEMS mirror is a type of microelectromechanical system (MEMS) device that uses electromagnetic, electrostatic, or piezoelectric actuation to tilt a mirror surface. The mirror surface may be made of a thin layer of metal or dielectric material and is suspended by one or more torsion springs. The mirror may be tilted in one or two dimensions by applying an electric field or magnetic field to the actuator. By manipulating the mirror, a user may draw large images from a small device.

Figure 14B:
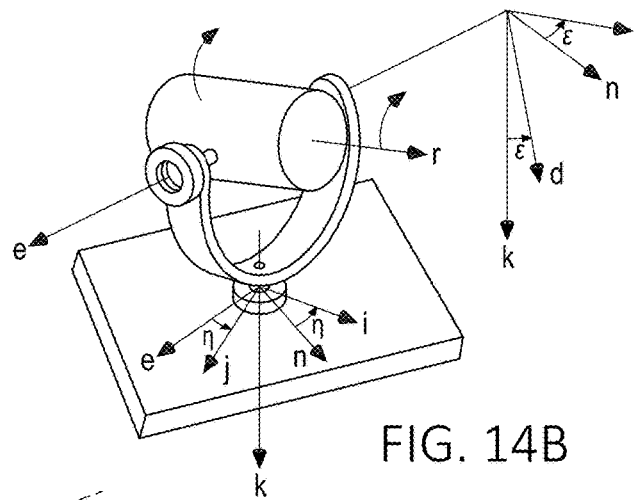
FIG. 14B is a gimbal system for use in one or more of the systems of the present disclosure.

With reference to FIG. 14B, the system may include a two-axis gimbal, or a three-axis gimbal configured as a pivoted support that permits rotation of an object about an axis. The three-axis gimbal includes a set of three gimbals, one mounted on the other with orthogonal pivot axes, which allows an object mounted on the innermost gimbal to remain independent of the rotation of its support. The object may be mounted to the three-axis gimbal so the object may be viewable by observers, or to the mirror in the three-axis gimbal and/or have the eye tracking control. Alternatively, the system may include a five-axis (e.g., including x, y, z, $\theta$) or six-axis (e.g., including (x, y, z, $\theta$, $\Phi$) position system.

Figure 14C:
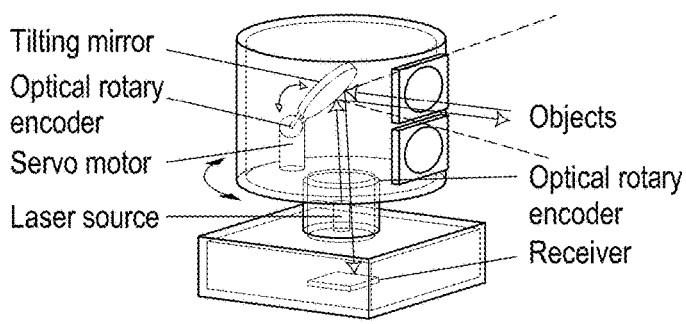
FIG. 14C is a LIDAR system for use in one or more of the systems of the present disclosure.

With reference to FIG. 14C, the system may include LIDAR, similar in function to radar and sonar. With a radar system, a beam of coded radio waves may be transmitted from a source (e.g., a jet plane), which may be received as a return beam reflected off a nearby object (e.g., another plane in proximity to the source plane); the radar system uses the time taken for the beam to return to determine how far away the object is. A sonar functions similarly, but underwater and only uses sound waves (because ordinary light and radio waves do not travel through water very far). In everyday, on-land situations—e.g., driving down the street or navigating through a building-reflected laser light may be a better source of information than either radio waves or sound, which is why LIDAR is preferred. LIDAR is simple, reliable, and relatively low-cost. In one aspect, LIDAR may be incorporated into the system of the present disclosure and used to scan an observer or any object and generate, in real time, a holographic image of the observer and/or object.

Figure 14E:
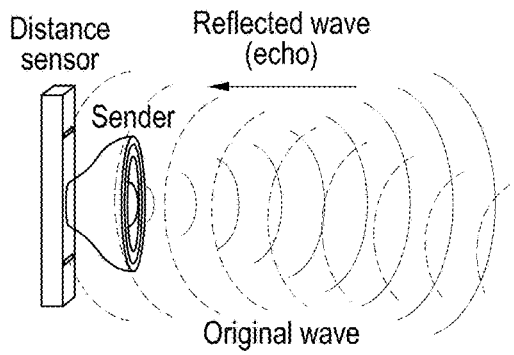
FIG. 14E is an ultrasonic sensor assembly for use in one or more of the systems of the present disclosure.
Figure 14D:
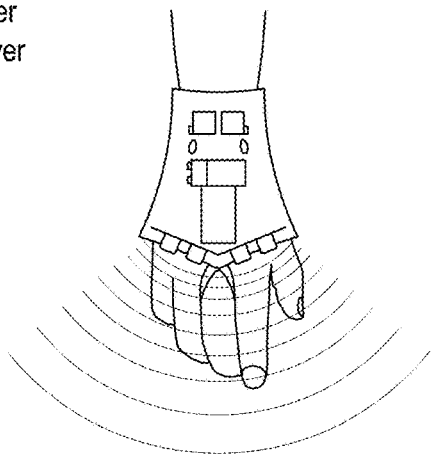
FIG. 14D is a haptic glove for use in one or more of the systems of the present disclosure.

With reference to FIG. 14D, the system may include a wearable haptic glove configured to provide haptic feedback to the user. The function of the haptic glove may depend on their intended use. For example, haptic gloves for the blind and/or visually impaired provide the wearer with information about obstacles in their immediate surroundings. Haptic VR gloves provide haptic feedback when touching an object in a 3D environment, which will provide vibrations on the fingertips (or other parts of the user's hands, wrists, and/or arms) to simulate the presence of an object. Haptic feedback gloves allow users to experience realistic touch and interactions through advanced tactile feedback, such as feedback to the user while the 3D volumetric image is contacted and/or manipulated by the user.

In an aspect of the present disclosure, sound waves may be employed to impart a "feel" to the user's body, such as without the use of the haptic glove.

With reference to FIG. 14E, the system may include an ultrasonic touch sensor. The ultrasonic touch sensor uses transmission, reflection, and reception of ultrasonic waves. When an object, such as a hand or finger, comes within proximity of the sensor, the ultrasonic sound waves reflect back to the sensor. The sensor then calculates the time it takes for the echo to return, effectively determining the distance and position of the object.

Figure 14F:
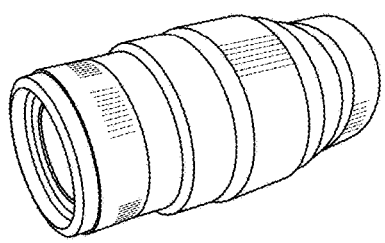
FIG. 14F is a projection lens system for use in one or more of the systems of the present disclosure.

With reference to FIG. 14F, the system may include a projection lens system.

The projection lens system may include an optical system created by connecting several lenses in a sequence. The projection lens system focuses light from the lamp to the lens to produce the image seen by an observer. The projection lens is like the objective in a microscope system and images the slide plane onto the screen. The convex lenses in projectors enlarge whatever subject is placed before it, similar in function to a magnifying glass. The projection system allows an observer to view images on a screen or a flat surface by projecting and magnifying them at a certain distance, while still preserving high-quality images.

Figure 14G:
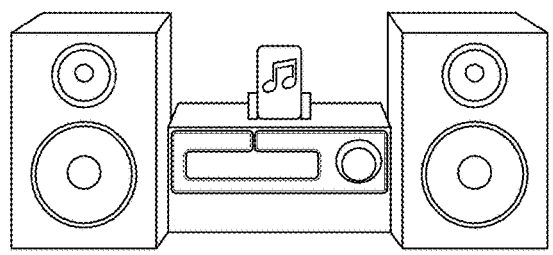
FIG. 14G is a sound reinforcement system for use in one or more of the systems of the present disclosure.

With reference to FIG. 14G, the system of the present disclosure may include a sound reinforcement system including a combination of microphones, signal processors, amplifiers, and loudspeakers in enclosures all controlled by a mixing console that makes live or pre-recorded sounds louder and may also distribute those sounds to a larger or more distant audience. In some situations, a sound reinforcement system may be used to enhance or alter the sound of the sources on the stage, typically by using electronic effects, such as reverb, as opposed to simply amplifying the sources unaltered. The type of sound system used may depend on the venue in which the system is implemented. The sound system can be as simple as two speakers or as complex as needed for a total immersive experience for the observer(s).

FIGS. 15A and 15B show an exemplary embodiment of a volumetric monitor for use in the system of the present disclosure. The volumetric monitor includes a plurality of panels, for example, monitors or concave mirrors. The panels are arranged in a circle, either vertically or horizontally. As such, when the volumetric display is spun, an observer will only see the 3D images. The number of panels in the volumetric monitor will be determined by the complexity of the produced volumetric display. A concave mirror may then be used to project the volumetric image.

A concave mirror will project an image. As shown FIG. 15B, one or more lasers are configured to draw an image on multiple mirrors to produce a volumetric image in the center which may be projected by the system of the present disclosure. The amount of mirrors and speed depends on the complexity of the image to be produced. A conical mirror (FIG. 15C) may also be used to direct the beam if necessary.

Figure 18:
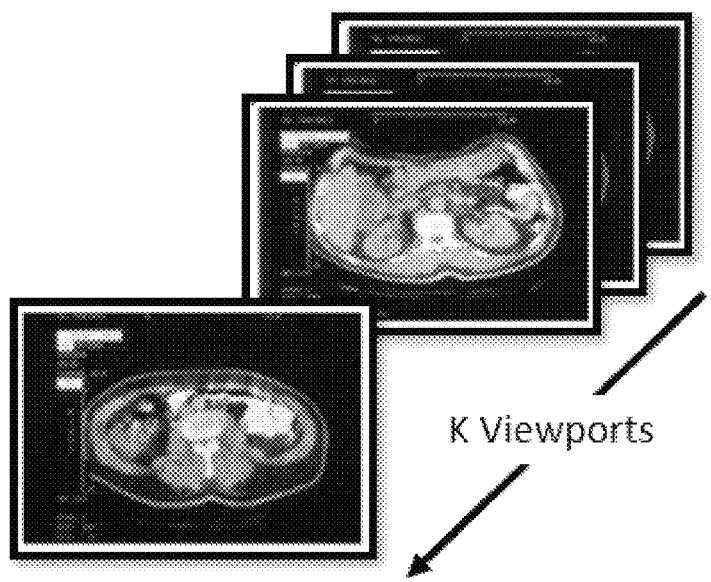
FIG. 18 illustrates an exemplary arrangement of a stack of flat panel displays employable to generate a 3D volumetric image.

Referring to FIGS. 15D and 18, a plurality of monitors (e.g., flat panel displays) may be stacked in an array capable of capable of displaying an image arranged in a row. The image will be generated on one device and then regenerated to the next and using persistence of vision form a volumetric image without moving parts, similar to the operation of flip cards. A volumetric display may be formed from a stack of thin panel lcd displays. The pixels in the lcd displays may be transparent. The display is not limited to LCD technology but might also use other forms of thin panel displays such as Organic LEDs (OLED) (see, e.g., FIG. 18).

In aspects of the present disclosure, a method of multiplexing a video stream includes reformatting a parallel series of K video streams to a single stream containing an m by n array of images arranged in an m by n grid pattern. Each image corresponds to a lower resolution copy of the individual input streams. The product of n and m equals K. The resolution of each image is equal to its original size divided by m or n for the horizontal or vertical directions, respectively. This multiplexing operation can be performed in a microprocessor and/or a high speed logic array. Three dimensional video streams can be preprocessed and recorded in standard video formats.

The reverse operation of demultiplexing can be performed in a microprocessor and/or a high speed logic array. This operation takes the encoded video stream and reformats it into K separate video streams. Each video stream is then sent to its designated display panel in the stack.

In aspects of the present disclosure, the system may be supported on or mounted to an autonomous vehicle, such as, for example, an autonomous mobile cart configured to transport the system to potential users of the system.

For additional examples of an apparatus and method for projecting 3D images, reference may be made to U.S. Pat. No. 10,310,284, filed Jul. 7, 2017, and U.S. Pat. No. 11,092,724, filed Apr. 18, 2019, the entire contents of each of which are incorporated by reference herein.

Referring generally to FIGS. 1 to 6B, embodiments of a system 10 for generating and displaying a three-dimensional image 12 is provided. The three-dimensional image 12 is a floating image projected at a position located outside of a housing 14 (FIGS. 4A and 4B) of the system 10 in front of an observer field of view 2. The image 12 is holographically projected so it appears in 3D without glasses. The system 10 generally includes an enclosure or housing 14 defining a chamber 16 therein, a curved mirror 18 positioned in the chamber 16, an optical fold mirror 22 positioned in the chamber 16, a display device 17, and a window 20, such as, for example, a transparent glass window as shown in FIG. 4A or a transparent display as shown in FIGS. 5A-5D. The housing 14 may have a rectangular shape, but may assume any suitable shape, and is configured to prevent light from passing therethrough. As an example, the curved mirror 18 may be a free-form mirror, a concave spherical mirror, or an off-axis concave (OAP) mirror, and has a reflective surface 19. The curved mirror 18 is configured to receive reflected light from the optical fold mirror 22 and project the three-dimensional image 12 outside of the housing 14 in front of the transparent display 20. The mirrors described herein may be formed of a naturally reflective material or may include a base layer with an optically reflective coating formed thereon.

Figure 7A:
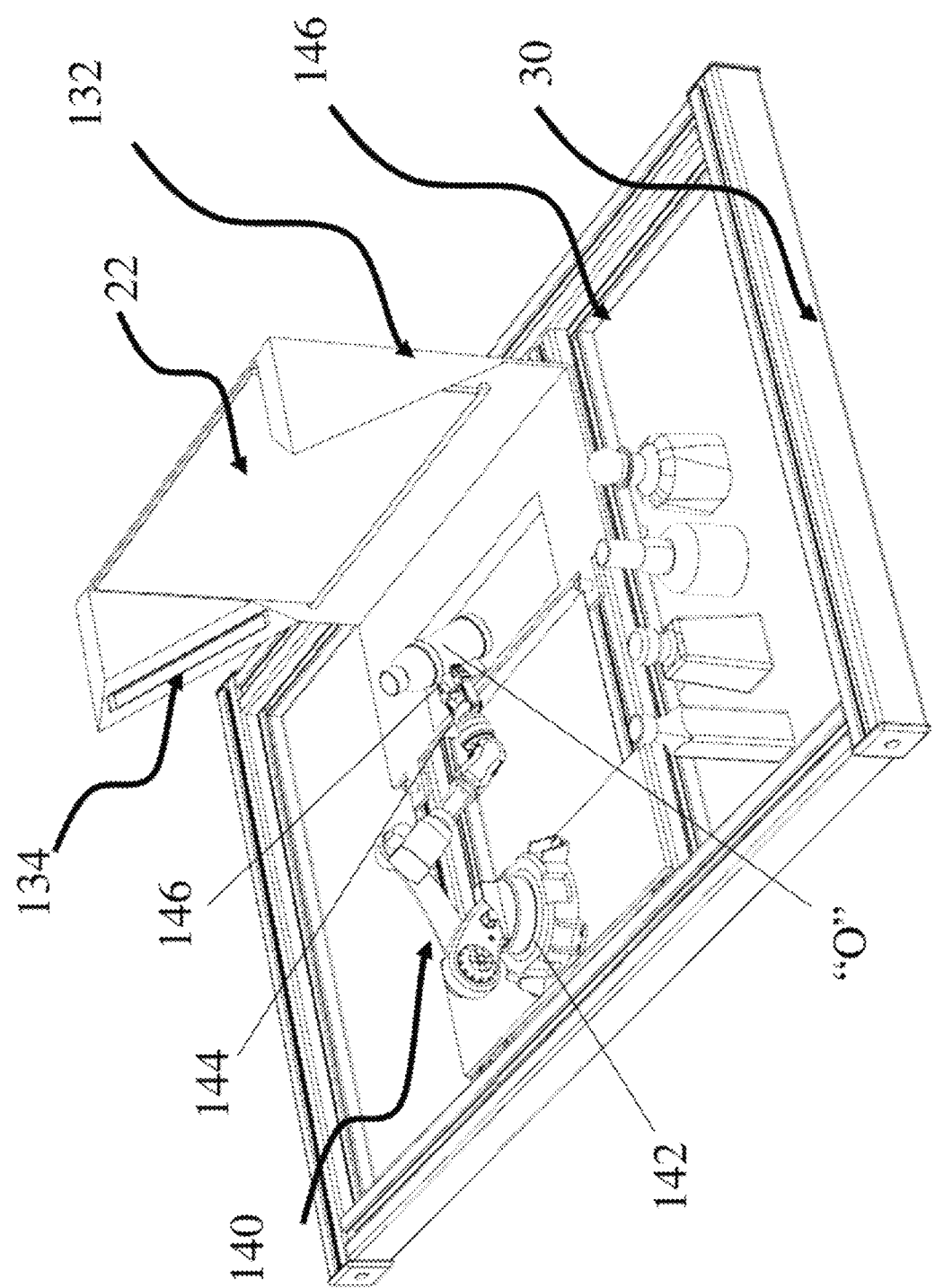
FIG. 7A is a right-side, perspective view illustrating components of another exemplary embodiment of a 3D volumetric image projection system.
Figure 7B:
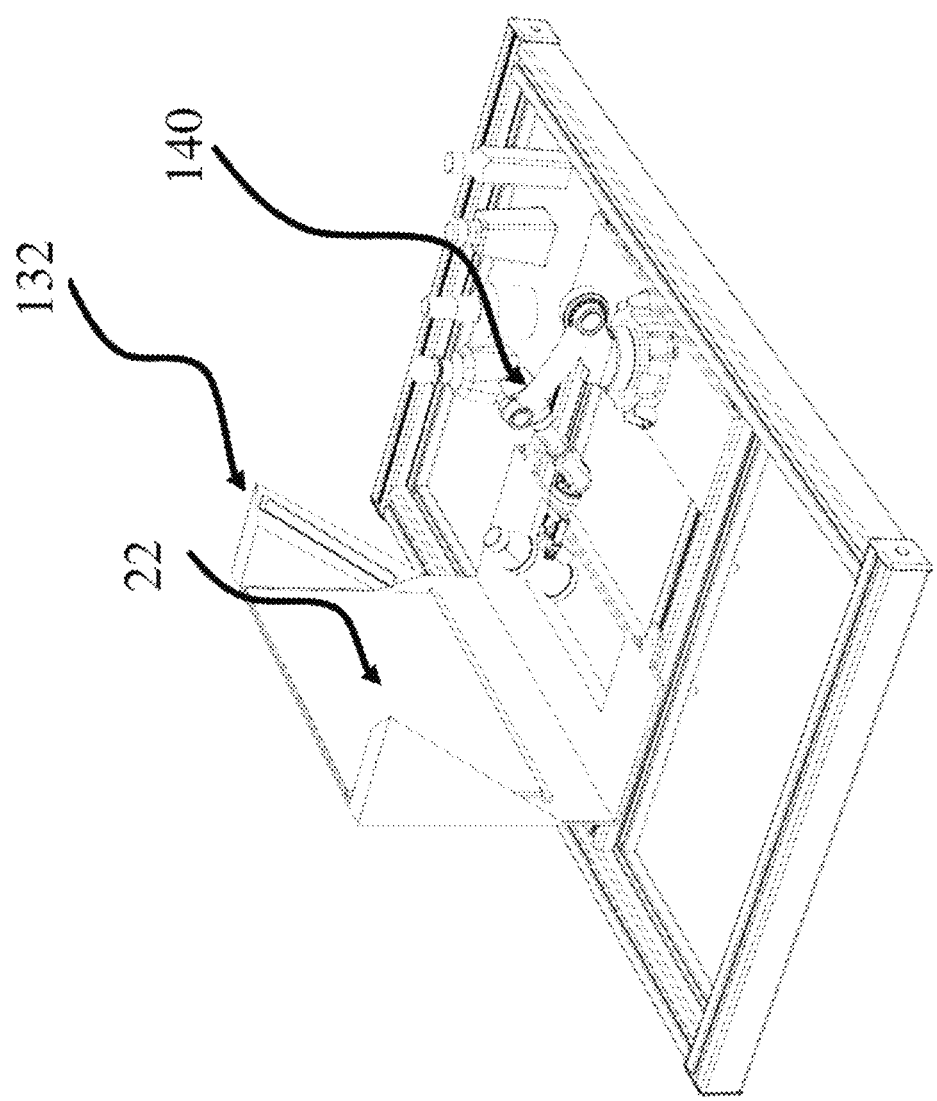
FIG. 7B is a left-side, perspective view of the system of FIG. 7A.

The housing 14 includes a front wall 14a and an opposite rear wall 14b. The front wall 14a may include one or more speakers 5a, 5b, and defines an opening therethrough, in which the transparent display 20 is positioned. The transparent display 20 is configured to display an image or video that functions as a backdrop for the 3D image 12 projected by the curved mirror 18. The transparent display 20 is also configured to permit the light reflected from the curved mirror 18 to pass from within the housing 14 to a location external of the housing 14. The rear wall 14b may include a rear display 26 configured to display the same image depicted in the 3D image 12. The rear wall 14b may also include a power switch 6 and an image server/system controller 7. An external source of power, such as a battery (e.g., a rechargeable battery) may be employed to power the system. The controller 7 may be or may include a general purpose computer or any combination of the components of the general purpose computer (see, e.g., general purpose computer 17 described below with reference to FIG. 17). The controller 7 may operate as a video controller. For example, the video controller may control the image or video 12 that is displayed. The display device 17 may be a tablet, a monitor, or a mobile phone, configured to display an image of an object to be represented by the 3D image 12. In other aspects, as shown in FIGS. 7A and 7B, instead of a display device 17, the system 10 includes a physical object "O" to be represented by the 3D image 12.

In aspects of the present disclosure, a laser may be employed to draw directly onto any of the mirrors described herein, such as directly onto the concave mirror. When a laser is employed, for example, the folding mirror described herein might be omitted. Alternatively, an oscillating fold mirror might be employed to display an image.

In one embodiment, the controller 7 may store firmware (e.g., software or executable computer instructions) configured to control the operation of the controller 7 to select the desired video or image(s) to be displayed by the system. The firmware is updatable, such as to improve or update the operation of the controller 7.

Figures 4A, 4B:
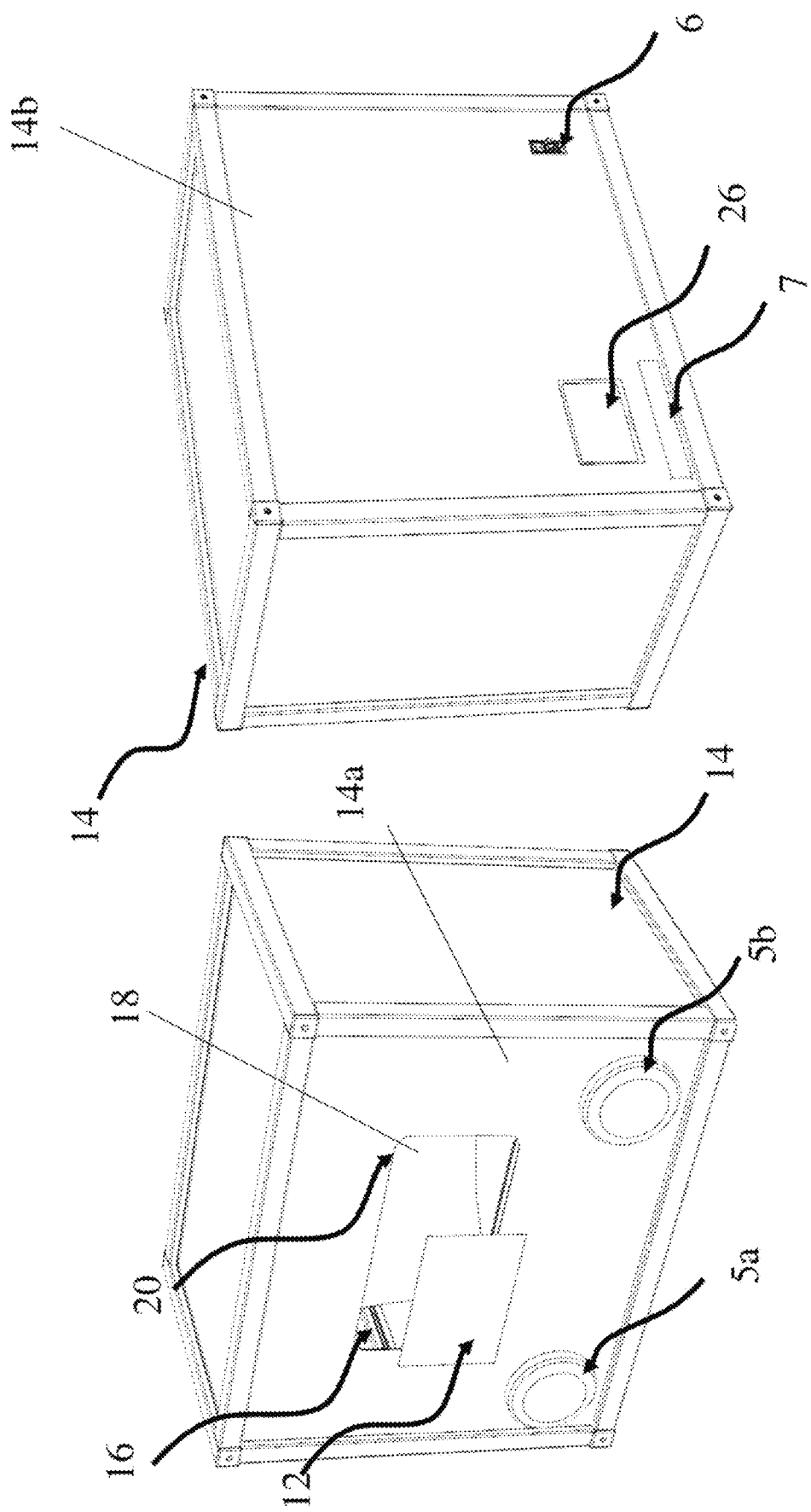
FIG. 4A is a front, perspective view illustrating an exemplary embodiment of components of the 3D volumetric image projection system enclosed in a housing.
FIG. 4B is a rear, perspective view of the system of FIG. 4A.
Figure 5A:
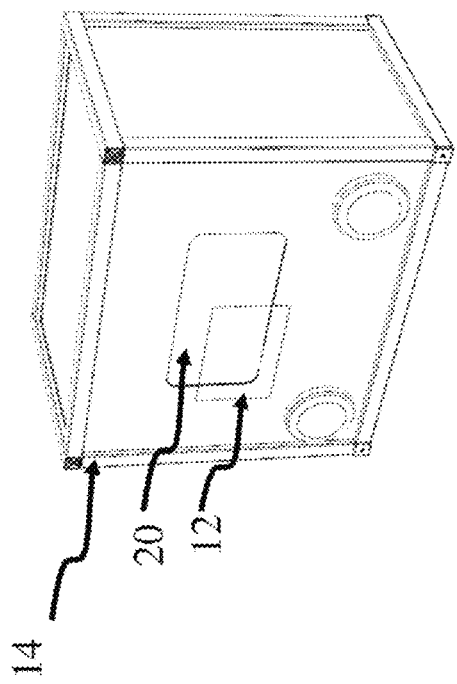
FIG. 5A is a right-side, perspective view of an exemplary embodiment of components of a 3D volumetric image projection system enclosed in a housing.
Figure 5D:
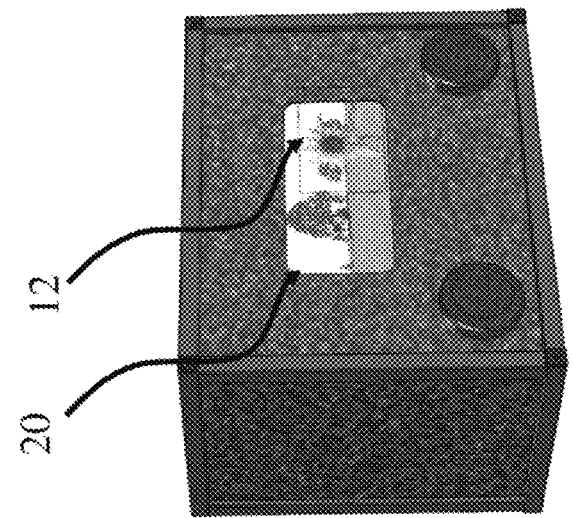
FIG. 5D is a left-side, perspective view of the system of FIG. 5A showing the 3D image and the image displayed by the transparent display.
Figure 5C:
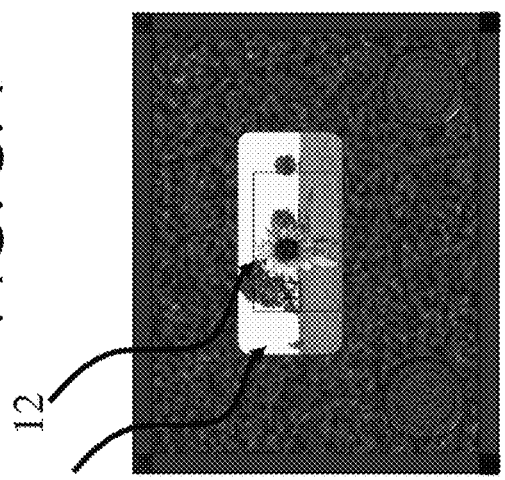
FIG. 5C is a front view of the system of FIG. 5B showing the 3D image and the image displayed by the transparent display.
Figure 5B:
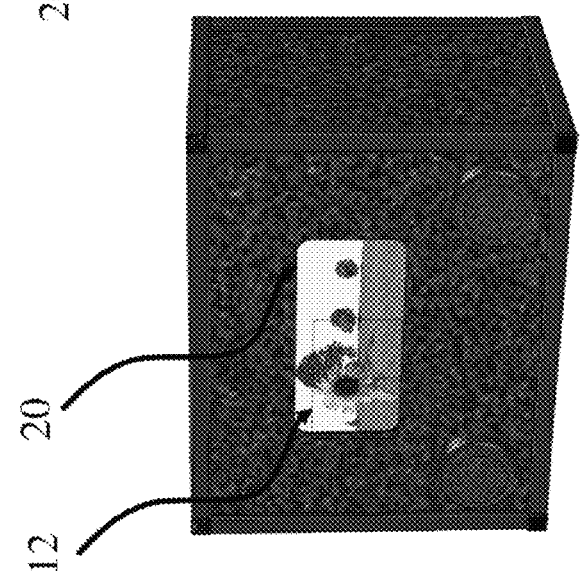
FIG. 5B is a right-side, perspective view of the system of FIG. 5A showing a 3D image and an image displayed by a transparent display.
Figure 6A:
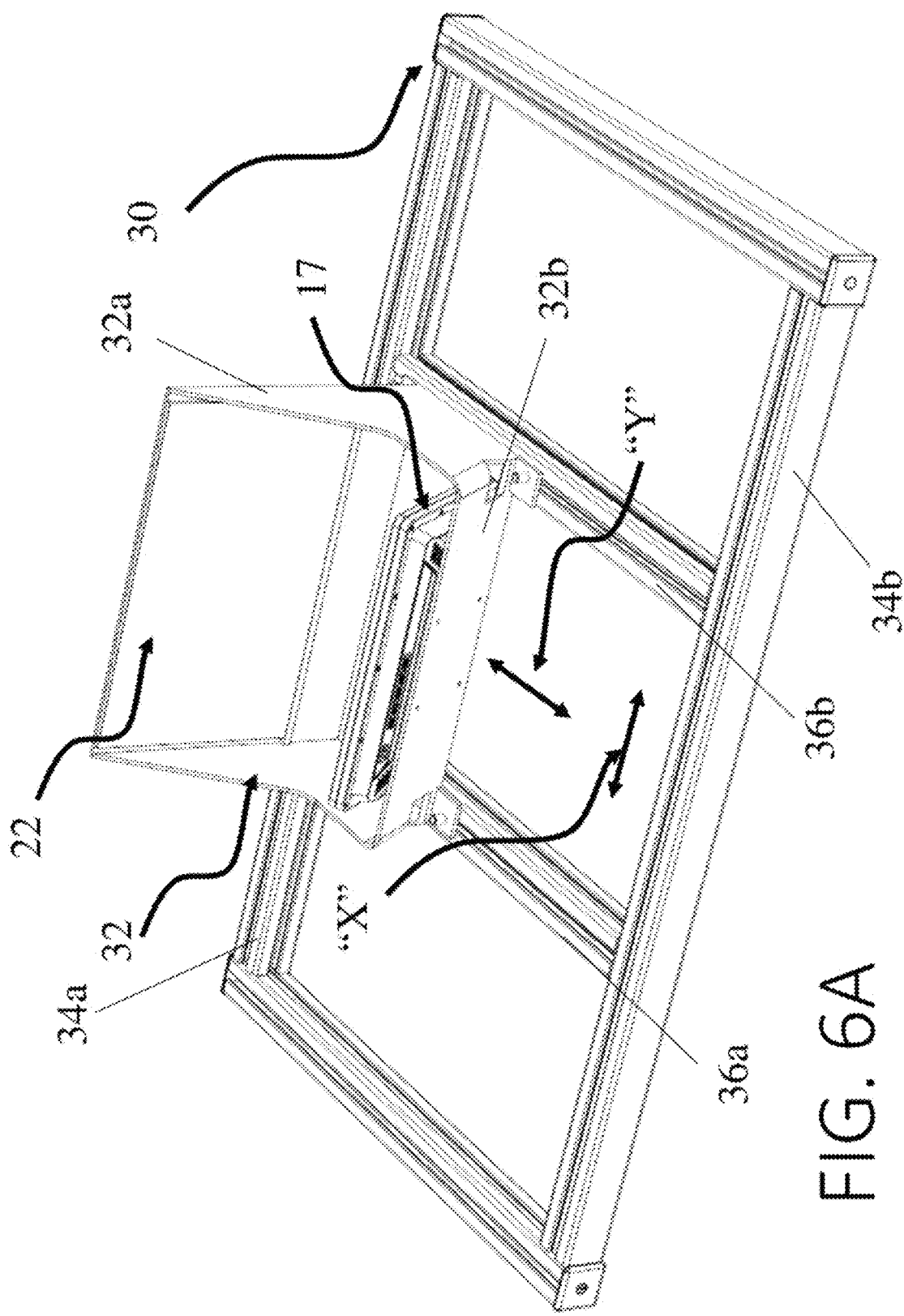
FIG. 6A is a front, perspective view illustrating components of another exemplary embodiment of a 3D volumetric image projection system.
Figure 6B:
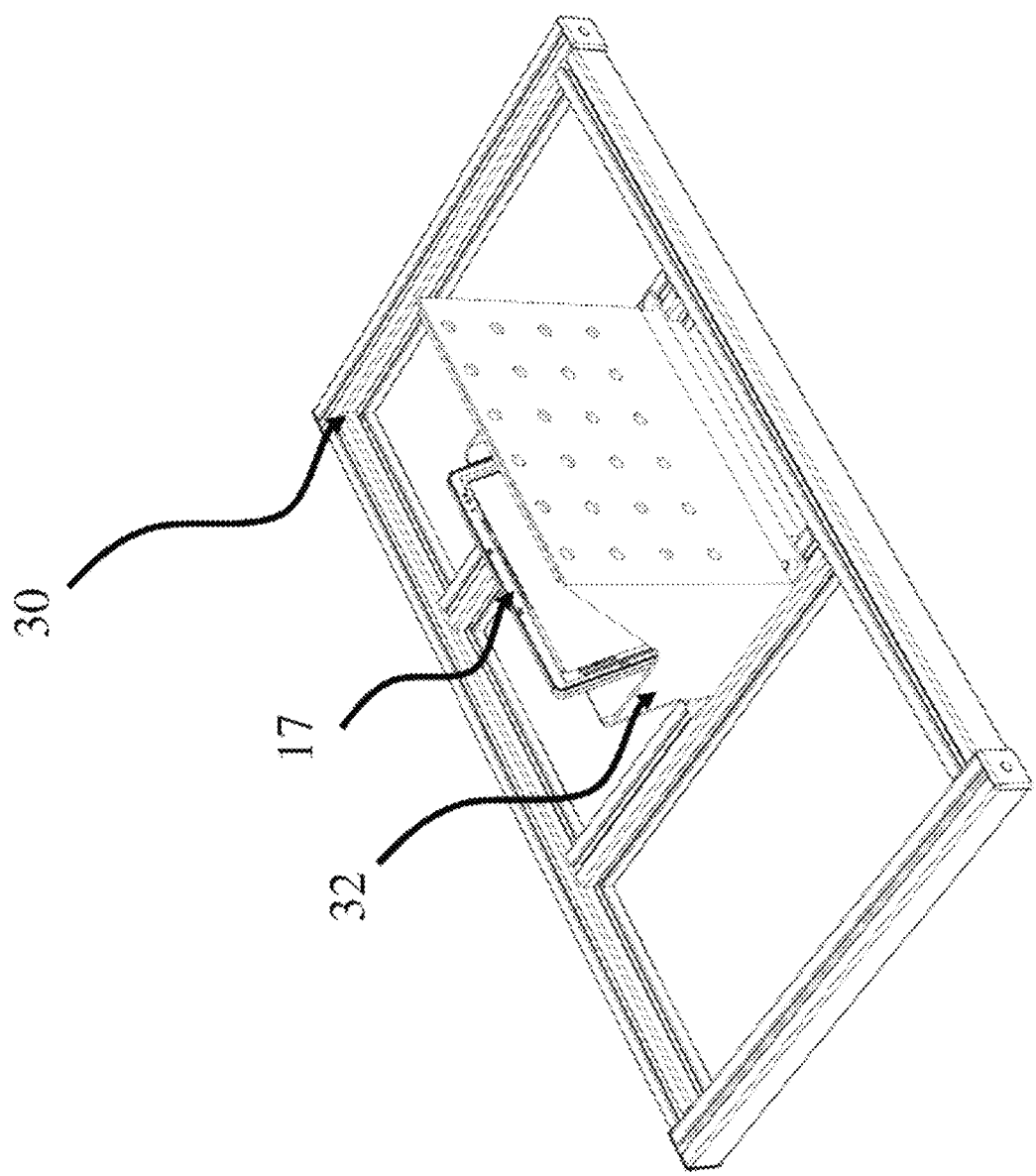
FIG. 6B is a rear, perspective view of the system of FIG. 6A.

In one embodiment, with particular reference to FIGS. 6A and 6B, the system 10 may include a track 30 positioned in the housing 14, and a tray 32 slidably supported on the track 30. The tray 32 supports the optical fold mirror 22 and the display device 17 thereon such that the optical fold mirror 22 and the display device 17 are configured to slide on the track 30 to adjust at least an axial position of the optical fold mirror 22 and the display device 17 within the housing 14 (FIGS. 4A and 4B). The track 30 may include a first pair of spaced-apart, parallel rails 34a, 34b, and a second pair of spaced-apart, parallel rails 36a, 36b positioned between the first pair rails 34a, 34b and configured to slide relative to and along the first pair rails 34a, 34b along a horizontal axis "X." The optical fold mirror 22 is slidably supported on the second pair rails 36a, 36b and configured to slide relative to and along the second pair rails 36a, 36b along a vertical axis "Y" that is perpendicular to the horizontal axis "X." In aspects, the tray 32 may have a pair of tongues (not explicitly shown) for receipt in a corresponding groove defined in the second pair of rails 36a, 36b to allow for axial movement of the tray 32 on the second pair of rails 36a, 36b. Each of the second pair of rails 36a, 36b may include a tongue (not explicitly shown) positioned at opposite ends thereof for receipt in a corresponding groove defined in the first pair of rails 34a, 34b to allow for axial movement of the second pair of rails 36a, 36b on the first pair of rails 34a, 34b. Structures other than tongue-in-groove connections for enabling slidable movement are also contemplated. The tray 32 may also be arranged to move vertically with respect to the X and Y axis directions, such as in a Z axis direction. As an example, the tray 32 may be arranged to move in a direction orthogonal to the X and Y axes.

The tray 32 of the system 10 may include a pair of upright, opposing walls 32a, 32b. The optical fold mirror 22 may be removably attached to or formed with the upright wall 32a, and the display device 17 is removably supported in the tray 32, such that the optical fold mirror 22 and the display device 17 are configured to move along the track 30 as a unit to adjust a focus of the displayed image 12. The upright walls 32a, 32b of the tray 32 orient the display device 17 and the optical mirror 22 to face each other. The display device 17 may be a tablet, a monitor, or a mobile phone.

In another embodiment, as shown in FIGS. 7A and 7B, the system 10 may include a tray assembly 132 and a robotic arm 140 each positioned in the housing 14 (FIGS. 4A and 4B). The tray assembly 132 supports the optical fold mirror 22 and has a chip on board LED lighting assembly 134. The lighting assembly 134 is positioned adjacent the optical fold mirror 22 and is configured to transmit light onto an object "O" supported by the robotic arm 140. The robotic arm 140 may include plurality of links which are interconnected at joints each of which may include an actuator for rotating the links relative to each other. In aspects, the robotic arm 140 has a proximal end 142 slidably supported on the track 30, and a distal end 144 supporting an end effector 146 configured to support the object "O" that is represented by the three-dimensional image 12. The robotic arm 140, via actuation of one or more motors, is configured to adjust a spatial position (e.g., the pitch, roll, and/or yaw) of the object "O" relative to the optical fold mirror 22. The system 10 may include an object storage area 146 positioned within the housing 14 adjacent the track 30 configured to store or hold a plurality of different objects "O" for viewing.

Figure 17:
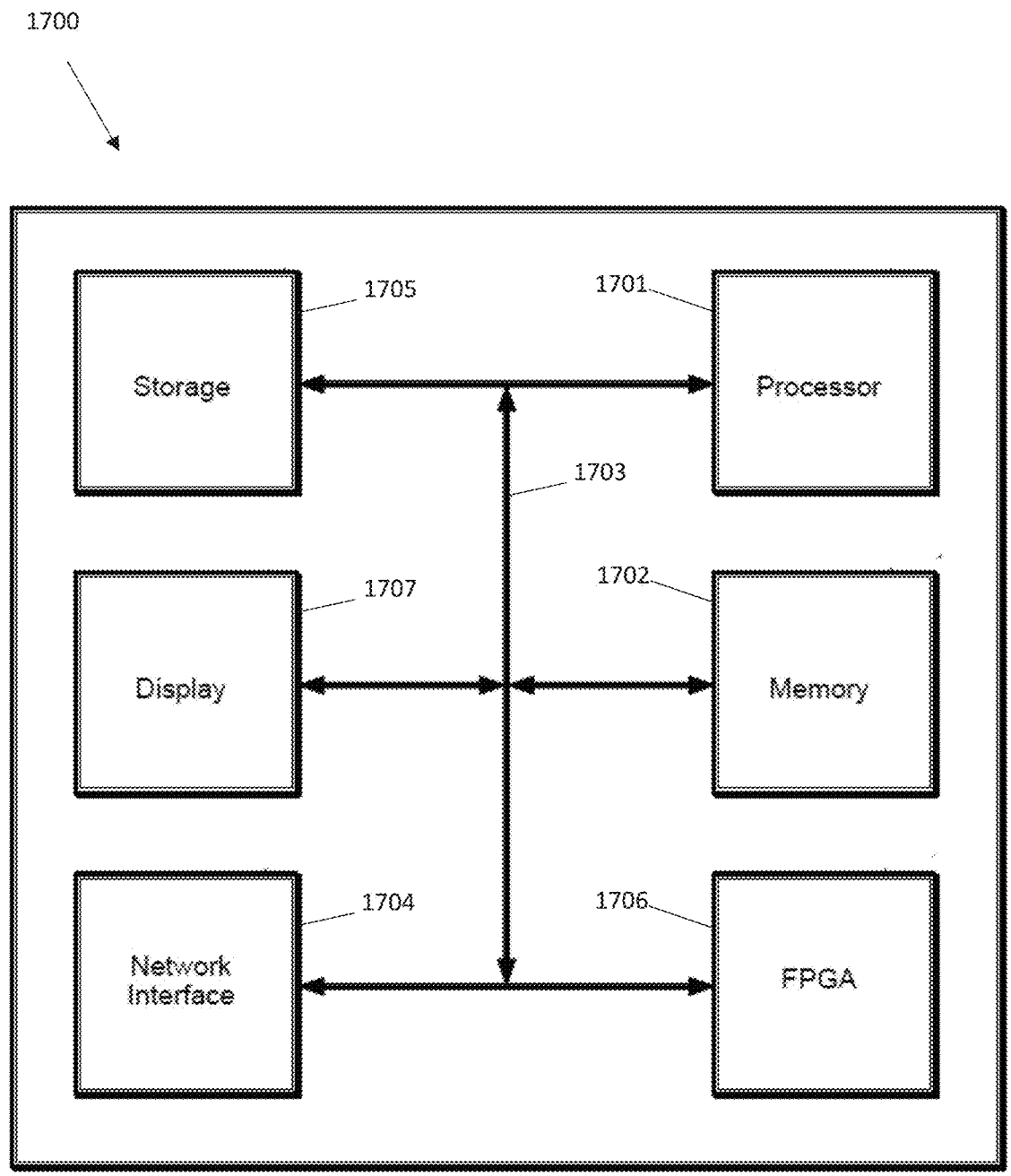
FIG. 17 is a flow chart of a computer employable by the 3D volumetric image projection system.

Referring to FIG. 17, a general-purpose computer 1700 employable by the system described herein is described. The computer 1700 may include a processor 1701 connected to a computer-readable storage medium or a memory 1702 which may be a volatile type memory, e.g., RAM, or a non-volatile type memory, e.g., flash media, disk media, etc. The processor 1701 may be another type of processor such as, without limitation, a digital signal processor, a microprocessor, an ASIC, a graphics processing unit (GPU), field-programmable gate array (FPGA), or a central processing unit (CPU).

In some aspects of the disclosure, the memory 1702 can be random access memory, read-only memory, magnetic disk memory, solid state memory, optical disc memory, and/or another type of memory. The memory 1702 can communicate with the processor 1701 through communication buses 1703 of a circuit board and/or through communication cables such as serial ATA cables or other types of cables. The memory 1702 includes computer-readable instructions that are executable by the processor 1701 to operate the computer 1700 to execute the various functions described herein. The computer 1700 may include a network interface 1704 to communicate (e.g., through a wired or wireless connection) with other computers or a server. A storage device 1705 may be used for storing data. The computer 1700 may include one or more FPGAs 1706. The FPGAs 1706 may be used for executing various functions described herein. A display 1707 may be employed to display data processed by the computer 1700.

Figure 19:
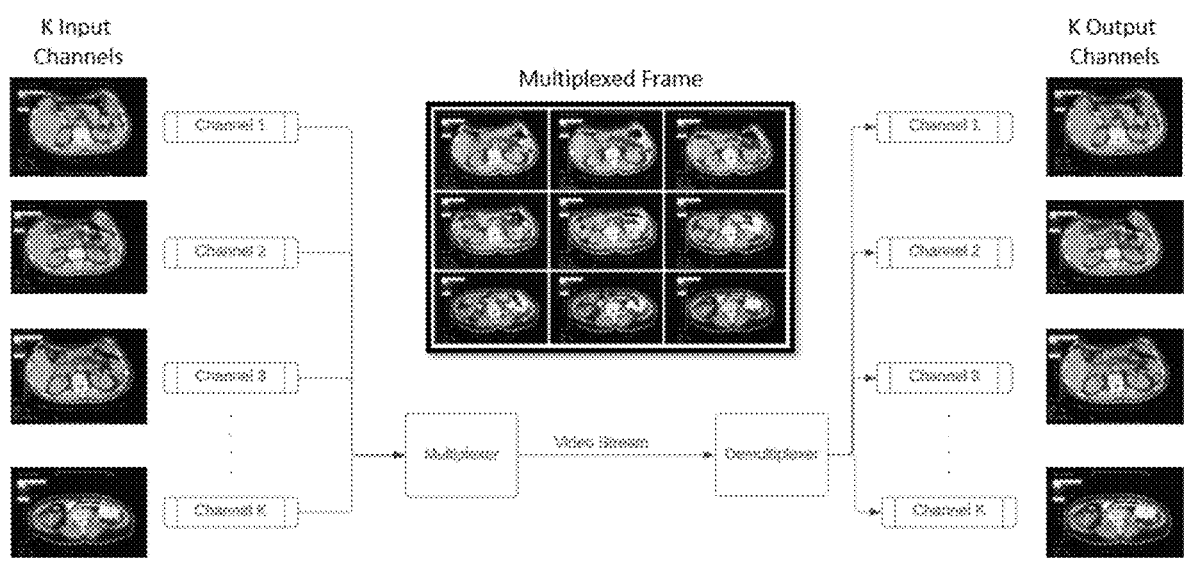
FIG. 19 is a flowchart illustrating an exemplary for multiplexing a video stream employable by the systems of the present disclosure.

FIG. 19 is a flowchart illustrating an exemplary for multiplexing a video stream employable by the systems of the present disclosure.

Referring particularly to FIG. 19, a method of multiplexing a video stream is presented. Reformatting a parallel series of K video streams to a single stream containing an m by n array of images arranged in an m by n grid pattern. Each image corresponds to a lower resolution copy of the individual input streams. The product of n and m must equal K. The resolution of each image is equal to its original size divided by m or n for the horizontal or vertical directions, respectively. This multiplexing operation can be performed in a microprocessor and/or a high speed logic array. Three dimensional video streams can be preprocessed and recorded in standard video formats.

The reverse operation of demultiplexing can be performed in a microprocessor and/or a high speed logic array. This operation takes the encoded video stream and reformats it into K separate video streams. Each video stream is then sent to its designated display panel in the stack.

Referring to FIGS. 17 to 19, an exemplary operation of stacked displays is, as follows.

Input Video Feed:
  8k hdmi resolution. 7680×4320 pixels as an example
  Nested viewports multiplexed into input
  Number of viewports m*n=K.
  Resolution=7680/m×4320/n
  For example; m=n=3, Depth=9 shown
  Output Resolution=2560×1440
  9 Viewports
  For m=n=4, Depth=16
  Resolution=1920×1080
  16 Viewports.
Output Video Feed:
  K=m*n outputs
  Display stack has K layers
  Video image is demultiplexed into K outputs, one for each display.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A system for generating and displaying a three-dimensional image, the system comprising:
   a housing;
   a track positioned in the housing;
   an optical fold mirror configured to slide on the track to adjust at least an axial position of the optical fold mirror within the housing;
   a curved mirror configured to receive reflected light from the optical fold mirror and project a three-dimensional image outside of the housing; and
   a tray slidably supported on the track, wherein the optical fold mirror is supported on the tray.

2. The system according to claim 1, further comprising a display device supported in the tray, wherein the optical fold mirror and the display device are configured to move along the track as a unit.

3. The system according to claim 2, wherein the display device is oriented in a direction facing the optical fold mirror.

4. The system according to claim 2, wherein the display device includes at least one of a tablet, a monitor, or a mobile phone.

5. The system according to claim 1, further comprising a robotic arm including:
   a proximal end slidably supported on the track; and
   a distal end supporting an end effector configured to support an object that is represented by the three-dimensional image, wherein the robotic arm is configured to adjust a spatial position of the object relative to the optical fold mirror.

6. The system according to claim 5, further comprising an object storage area positioned within the housing adjacent the track.

7. The system according to claim 1, wherein the track includes:
- a first pair of spaced-apart, parallel rails; and
- a second pair of spaced-apart, parallel rails positioned between the first pair of spaced-apart, parallel rails and configured to slide relative to and along the first pair of spaced-apart, parallel rails along a horizontal axis, wherein the optical fold mirror is slidably supported on the second pair of spaced-apart, parallel rails and configured to slide relative to and along the second pair of spaced-apart, parallel rails along a vertical axis that is perpendicular to the horizontal axis.

8. A system for generating and displaying a three-dimensional image, the system comprising:
- a housing;
- a track positioned in the housing;
- an optical fold mirror configured to slide on the track to adjust at least an axial position of the optical fold mirror within the housing; and
- a curved mirror configured to receive reflected light from the optical fold mirror and project a three-dimensional image outside of the housing,
- wherein the housing includes a window through which the reflected light from the curved mirror is transmitted.

9. The system according to claim 8, wherein the housing includes a front wall, the front wall having the window.

10. The system according to claim 9, wherein the housing includes a rear wall spaced from the front wall, the rear wall including a rear display device.

11. The system according to claim 8, wherein the window is an opening, transparent glass, or a transparent display.

12. The system according to claim 8, wherein the window is a transparent display configured to display an image between the three-dimensional image and the curved mirror.

13. An autonomous vehicle supporting the system of claim 1.

14. A system for generating and displaying a three-dimensional image, the system comprising:
- a housing defining a chamber therein and including a front wall defining an opening therethrough;
- a transparent display positioned in the opening in the front wall and configured to display an image;
- an optical fold mirror positioned in the chamber of the housing; and
- an off-axis concave mirror configured to receive reflected light from the optical fold mirror and project a three-dimensional image outside of the housing in front of the transparent display.

15. The system according to claim 14, further comprising a robotic arm positioned in the chamber of the housing and configured to support an object that is represented by the three-dimensional image, wherein the robotic arm is configured to adjust at least one of a pitch, yaw, or roll of the object.

16. The system according to claim 15, further comprising a track movably supporting the robotic arm and the optical fold mirror such that the robotic arm and the optical fold mirror are configured to move together within the housing.

17. The system according to claim 15, further comprising a LED lighting assembly positioned adjacent the optical fold mirror and configured to transmit light onto the object.

18. The system according to claim 14, wherein the housing includes a rear wall positioned opposite the front wall, the rear wall including a display device configured to display an image that is viewable externally of the housing.

19. The system according to claim 14, further comprising at least one of a haptic glove, an eye tracking device, an ultrasonic sound generator, a mechanism to move at least one of the optical fold mirror or the eye tracking device, a magnification device, a sound system, or a laser imaging, detection, and ranging ("LIDAR") system.

* * * * *